United States Patent
Han et al.

(10) Patent No.: US 9,198,170 B2
(45) Date of Patent: Nov. 24, 2015

(54) METHOD FOR TRANSMITTING ACK/NACK INFORMATION AND METHOD FOR RECEIVING ACK/NACK INFORMATION, USER DEVICE, AND BASE STATION

(75) Inventors: Seunghee Han, Gyeonggi-do (KR); Jinmin Kim, Gyeonggi-do (KR); Hyunwoo Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 109 days.

(21) Appl. No.: 14/003,847

(22) PCT Filed: Mar. 23, 2012

(86) PCT No.: PCT/KR2012/002124
§ 371 (c)(1),
(2), (4) Date: Sep. 9, 2013

(87) PCT Pub. No.: WO2012/134113
PCT Pub. Date: Oct. 4, 2012

(65) Prior Publication Data
US 2014/0003380 A1     Jan. 2, 2014

Related U.S. Application Data

(60) Provisional application No. 61/467,396, filed on Mar. 25, 2011.

(51) Int. Cl.
*H04W 72/04* (2009.01)
*H04L 1/18* (2006.01)
*H04L 5/00* (2006.01)

(52) U.S. Cl.
CPC ......... *H04W 72/0413* (2013.01); *H04L 1/1861* (2013.01); *H04L 5/001* (2013.01); *H04L 5/0023* (2013.01); *H04L 5/0055* (2013.01)

(58) Field of Classification Search
None
See application file for complete search history.

(56) References Cited

U.S. PATENT DOCUMENTS

| 2010/0067461 | A1  | 3/2010 | Kwak et al. |         |
|--------------|-----|--------|-------------|---------|
| 2011/0032884 | A1* | 2/2011 | Yu et al.   | 370/329 |
| 2011/0058522 | A1* | 3/2011 | Xu et al.   | 370/329 |

OTHER PUBLICATIONS

Written Opinion and International Search Report issued in corresponding International Patent Application No. PCT/KR2012/002124 dated Oct. 30, 2012.
3GPP TSG RAN WG1 Meeting #62, R1-104452, "On transmission diversity for multi-A/N signaling", Nokia Siemens Networks, Nokia, 23-27 Aug. 2010.
3GPP TSG RAN WG1 Meeting #62, R1-104437, "Sortd resource allocation", Nokia Siemens Networks, Nokia, 23-27 Aug. 2010.

* cited by examiner

*Primary Examiner* — Diane Lo
(74) *Attorney, Agent, or Firm* — Morgan, Lewis & Bockius LLP

(57) ABSTRACT

The present invention relates to a transmission diversity technique for channel selection. According to the present invention, even if a transmission device transmits a signal using channel selection through a plurality of antenna ports, the overhead of a resource for channel selection, which occurs in proportion to the number of antennas, is reduced. Additionally, as the number of antenna ports participating in signal transmission is increased, multiplex capacity is reduced. According to the present invention, the degree to which the multiplex capacity is reduced according to the increase in the number of antenna ports is decreased.

4 Claims, 16 Drawing Sheets

PUCCH format 1a and 1b structure (normal CP case)

PUCCH format 1a and 1b structure (extended CP case)

PUCCH format 2, 2a and 2b structure (normal CP case)

PUCCH format 2, 2a and 2b structure (extended CP case)

METHOD FOR TRANSMITTING ACK/NACK INFORMATION AND METHOD FOR RECEIVING ACK/NACK INFORMATION, USER DEVICE, AND BASE STATION

TECHNICAL FIELD

The present invention relates to a wireless communication system. Specifically, the present invention relates to a method and apparatus for transmitting uplink control information.

BACKGROUND ART

Wireless communication systems have been widely deployed to provide various types of communication services such as voice or data services. Generally, a wireless communication system is a multiple access system capable of supporting communication with multiple users by sharing available system resources (bandwidth, transmit power, etc.). Multiple access systems include, for example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system and Multi Carrier Frequency Division Access (MC-FDMA) system.

DETAILED DESCRIPTION OF THE INVENTION

Technical Problems

It is an object of the present invention to provide a method and apparatus for efficiently transmitting control information in a wireless communication system. It is another object of the present invention to provide a channel format and a signal processing method and apparatus, for efficiently transmitting control information. It is a further object of the present invention to provide a method and apparatus for efficiently allocating resources for transmission of control information.

It will be appreciated by persons skilled in the art that that the technical objects that can be achieved through the present invention are not limited to what has been particularly described hereinabove and other technical objects of the present invention will be more clearly understood from the following detailed description.

Technical Solutions

In an aspect of the present invention, provided herein is a method for transmitting ACKnowledgement/Negative ACK (ACK/NACK) information to a base station at a user equipment including a plurality of antenna ports, comprising: receiving, from the base station, information indicating a plurality of first resources for a first antenna port and information indicating a second resource for a second antenna port among the plurality of antenna ports; and transmitting a modulation symbol according to the ACK/NACK information to the base station through the first antenna port on a first resource selected based on the ACK/NACK information among the plurality of first resources and transmitting the modulation symbol on the second resource to the base station through the second antenna port.

In an aspect of the present invention, provided herein is a method for receiving, by a base station, ACKnowledgement/Negative ACK (ACK/NACK) information from a user equipment including a plurality of antenna ports, comprising: transmitting, to the user equipment, information indicating a plurality of first resources for a first antenna port of the user equipment and information indicating a second resource for a second antenna port of the user equipment; receiving a modulation symbol on one first resource among the plurality of first resources from the user equipment and receiving the modulation symbol on the second resource from the user equipment; and determining the ACK/NACK information using the modulation symbol and using the first resource on which the modulation symbol is received In another aspect of the present invention, provided herein is a user equipment including a plurality of antenna ports, for transmitting ACKnowledgement/Negative ACK (ACK/NACK) information to a base station, comprising: a Radio Frequency (RF) unit configured to transmit/receive a radio signal; and a processor configured to control the RF unit, wherein the processor controls the RF unit to receive, from the base station, information indicating a plurality of first resources for a first antenna port and information indicating a second resource for a second antenna port among the plurality of antenna ports and controls the RF unit to transmit a modulation symbol according to the ACK/NACK information to the base station through the first antenna port on a first resource selected based on the ACK/NACK information among the plurality of first resources and to transmit the modulation symbol on the second resource to the base station through the second antenna port.

In another aspect of the present invention, provided herein is a base station for receiving ACKnowledgement/Negative ACK (ACK/NACK) information from a user equipment including a plurality of antenna ports, comprising: a Radio Frequency (RF) unit configured to transmit/receive a radio signal; and a processor configured to control the RF unit, wherein the processor controls the RF unit to transmit, to the user equipment, information indicating a plurality of first resources for a first antenna port of the user equipment and information indicating a second resource for a second antenna port of the user equipment, controls the RF unit to receive a modulation symbol on one first resource among the plurality of first resources from the user equipment and to receive the modulation symbol on the second resource from the user equipment, and determines the ACK/NACK information using the modulation symbol and using the first resource on which the modulation symbol is received.

In each aspect of the present invention, transmitting/receiving the modulation symbol on the second resource may include transmitting/receiving a signal corresponding to multiplication of information $w_C$ corresponding to the selected first resource and the modulation symbol.

In each aspect of the present invention, $w_C$ may be $e^{j2\pi(C/M)}$ where M is the number of the plurality of first resources and C is a number of the selected first resource among the plurality of first resources.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, control information can be efficiently transmitted in a wireless communication system. Further, a channel format and a signal processing method for efficiently transmitting resources can be provided. Moreover, resources for transmission of control information can be efficiently allocated.

According to the present invention, resource overhead for channel selection, generated in proportion to the number of antennas, is reduced even when a transmitting device transmits signals using channel selection through a plurality of antenna ports.

In addition, according to the present invention reduction of multiplexing capacity generated due to increase in the number of antenna ports participating in signal transmission is decreased although multiplexing capacity is reduced by increase in the number of antenna ports.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included as a part of the detailed description to provide a further understanding of the invention, provide embodiments of the invention and together with the description serve to explain the principle of the invention. In the drawings.

BEST MODE FOR CARRYING OUT THE INVENTION

Figure 1:
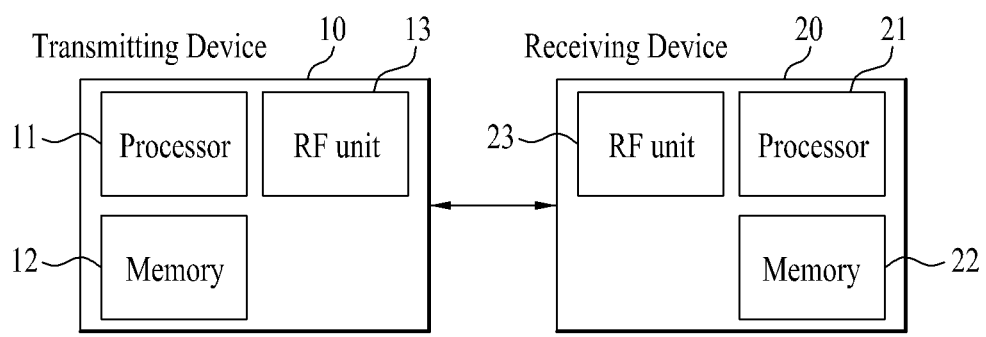
FIG. 1 shows a block diagram illustrating components of a transmitting device 10 and a receiving device 20 that may perform the present invention.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

Techniques, apparatus and systems described herein can be used in various wireless access technologies. For clarity, this application focuses on the 3GPP LTE(-A). However, technical features of the present invention are not limited thereto. For example, although the following description will be made based on a mobile communication system corresponding to a 3GPP LTE/LTE-A system, the following description can be applied to other mobile communication systems except unique features of the 3GPP LTE/LTE-A system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a User Equipment (UE) denotes a mobile or fixed type user terminal Examples of the UE include various equipments that transmit and receive user data and/or various kinds of control information to and from a base station. The UE may be referred to as, a Terminal Equipment (TE), a Mobile Station (MS), a Mobile Terminal (MT), a User Terminal (UT), a Subscriber Station (SS), a wireless device, a Personal Digital Assistant (PDA), a wireless modem, or a handheld device. Also, in the present invention, a Base Station (BS) means a fixed station that performs communication with a user equipment and/or another base station, and exchanges various kinds of data and control information with the user equipment and another base station. The base station may be referred to another terminology such as an Evolved-NodeB (eNB), a Base Transceiver System (BTS) and an Access Point (AP) and Processing Server (PS).

In the present invention, a Physical Downlink Control Channel (PDCCH), a Physical Control Format Indicator Channel (PCFICH), a Physical Hybrid automatic retransmit request Indicator Channel (PHICH), and a Physical Downlink Shared CHannel (PDSCH) may indicate a set of time-frequency resources or resource elements (REs) carrying Downlink Control Information (DCI), a set of time-frequency resources or REs carrying Control Format Indicator (CFI), a set of time-frequency resources or REs carrying downlink ACK/NACK (ACKnowlegement/Negative ACK), and a set of time-frequency resources or REs carrying DL data, respectively. In addition, a Physical Uplink Control CHannel (PUCCH), a Physical Uplink Shared CHannel (PUSCH), and a Physical Random Access CHannel) (PRACH) may indicate a set of time-frequency resources or REs carrying Uplink Control Information (UCI), a set of time-frequency resources or REs carrying UL data, and a set of time-frequency resources REs carrying a random access signal, respectively. In the present invention, time-frequency resource or RE that is assigned to or pertains to PDCCH/PCFICH/PHICH/PDSCH/PUCCH/PUSCH/PRACH may be called PDCCH/PCFICH/PHICH/PDSCH/PUCCH/PUSCH/PRACH RE or PDCCH/PCFICH/PHICH/PDSCH/PUCCH/PUSCH/PRACH resource. Therefore, in the present invention, PUCCH/PUSCH/PRACH transmission of a UE may be conceptually identical to UL control information/UL data/random access signal transmission on PUSCH/PUCCH/PRACH, respectively. In addition, PDCCH/PCFICH/PHICH/PDSCH transmission of a BS may be conceptually identical to DL data/control information transmission on PDCCH/PCFICH/PHICH/PDSCH, respectively.

Hereinafter, if a specific signal in a frame/subframe/slot/symbol/carrier/subcarrier is not transmitted, this is expressed as drop of transmission of the specific signal. For example, although a specific signal is allocated for transmission in a prescribed time-frequency resource, if a transmission device does not transmit the specific signal or transmits the specific signal at zero transmission power, this may be expressed as 'the transmission device drops transmission of the specific signal'.

FIG. 1 shows a block diagram illustrating components of a transmitting device 10 and a receiving device 20 that may perform the present invention.

The transmitting device 10 and receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so as to perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 control the overall operation of various modules in the transmitting or receiving device. The processors 11 and 21 may perform various control functions to perform the present invention. The processors 11 and 21 may be referred to as controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the BS codes and modulates signals and/or data scheduled by the processor 11 or a scheduler connected to the processor 11 to be transmitted to the exterior. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a Medium Access Control (MAC) layer. One Transport Block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 10 receives radio signals transmitted by the transmitting device 10. The RF unit 23 may include $N_r$ receive antennas and frequency down-converts each signal received through receive antennas into a baseband signal. The processor 21 decodes and demodulates the radio signals received through the receive antennas and restores data that the transmitting device 10 originally desired to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal transmitted in correspondence to an antenna defines an antenna viewed from the receiving device 20 and enables the receiving device 20 to perform channel estimation for the antenna, irrespective of whether a channel is a single radio channel transmitted from one physical channel or a composite channel transmitted from a plurality of physical antennas including the antenna. That is, an antenna is defined such that a channel for transmitting a symbol on the antenna can be derived from the channel through which another symbol on the same antenna is transmitted. An RF unit supporting a Multiple Input Multiple Output (MIMO) function of transmitting and receiving data using a plurality of antennas may be connected to two or more antennas.

Figure 2:
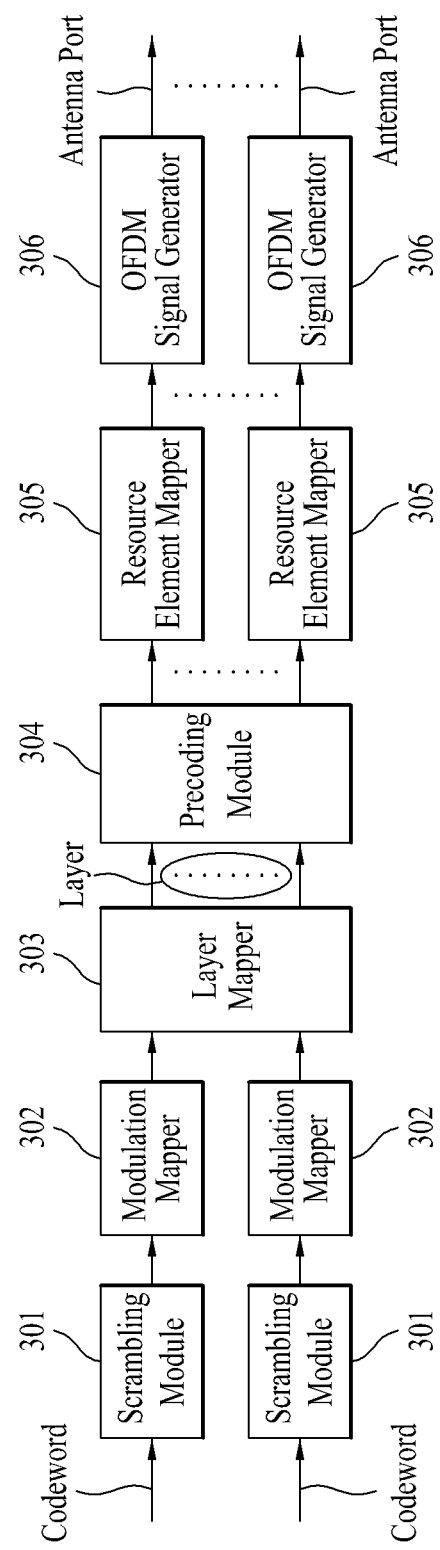
FIG. 2 shows a exemplary signal processing procedure at a transmitting device 10.

FIG. 2 shows a exemplary signal processing procedure at a transmitting device 10.

Referring to FIG. 2, the processor (11) of the transmitting device (10) includes scramblers 301, modulation mappers 302, a layer mapper 303, a precoder 304, RE mappers 305, Orthogonal Frequency Division Multiplexing (OFDM) signal generators 306.

The transmitting device (10) may transmit more than one codeword. The scramblers 301 scramble the coded bits of each codeword, for transmission on a physical channel. A codeword may be referred to as a data stream and is equivalent to a data block from the MAC layer. The data block from the MAC layer is referred to as a transport block.

The modulation mappers 302 modulate the scrambled bits, thus producing complex-valued modulation symbols. The modulation mappers 302 modulate the scrambled bits to complex-valued modulation symbols representing positions on a signal constellation in a predetermined modulation scheme. The modulation scheme may be, but not limited to, any of m-Phase Shift Keying (m-PSK) and m-Quadrature Amplitude Modulation (m-QAM).

The layer mapper 303 maps the complex-valued modulation symbols to one or several transmission layers.

The precoder 304 may precode the complex-valued modulation symbols on each layer, for transmission through the antenna ports. More specifically, the precoder 304 generates antenna-specific symbols by processing the complex-valued modulation symbols for multiple transmission antennas 500-1 to 500-$N_t$ in a MIMO scheme, and distributes the antenna-specific symbols to the RE mappers 305. That is, the precoder 304 maps the transmission layers to the antenna ports. The precoder 304 may multiply an output x of the layer mapper 303 by an $N_t*M_t$ precoding matrix W and output the resulting product in the form of an $N_t*M_F$ matrix z.

The RE mappers 305 map/allocate the complex-valued modulation symbols for the respective antenna ports to REs. The RE mappers 305 may allocate the complex-valued modulation symbols for the respective antenna ports to appropriate subcarriers, and may multiplex them according to users.

The OFDM signal generators 306 modulate the complex-valued modulation symbols for the respective antenna ports, that is, the antenna-specific symbols through OFDM or SC-FDM modulation, thereby producing a complex time-domain OFDM or SC-FDM symbol signal. The OFDM signal generators 306 may perform Inverse Fast Fourier Transform (IFFT) on the antenna-specific symbols and insert a Cyclic Prefix (CP) into the resulting IFFT time-domain symbol. The OFDM symbol is transmitted through the transmission antennas 500-1 to 500-$N_t$ to a receiving device after digital-to-analog conversion, frequency upconversion, etc.

In the meantime, if the transmitting device 10 applies the SC-FDMA scheme to codeword transmission, the processor 11 may include a Discrete Fourier Transform (DFT) module (or Fast Fourier Transform (FFT) module). The DFT module performs DFT or FFT (hereinafter referred to as DFT/FFT) on the antenna specific symbol, and outputs the DFT/FFT symbol to the resource element mapper 305.

The RF unit 23 may include a signal recoverer for down-converting a received signal to a baseband signal. The processor 21 may include a multiplexer for multiplexing received signals, and a channel demodulator for demodulating the multiplexed signal stream to a codeword. The signal recoverer, the multiplexer, and the channel decoder may be configured into an integrated module for performing their functions or independent modules. To be more specific, the signal recoverer may include an Analog-to-Digital Converter (ADC) may include an oscillator for down-coverting respective received signals, an Analog-to-Digital Converter (ADC) for converting an analog signal to a digital signal and etc. The processor 21 of the receiving device 20 may include a CP remover for removing a CP from the digital signal, an FFT module for generating a frequency-domain symbol by performing FFT on the CP-removed signal, and an RE-demapper/equalizer for recovering antenna-specific symbols from the frequency-domain symbol. The multiplexer recovers transmission layers from the antenna-specific symbols and the channel demodulator recovers the codeword transmitted by the transmitting device 10 from the transmission layers.

In the meantime, in the case where the receiving device 20 receives signals according to the SC-FDMA, the processor 21 may further include an Inverse Discrete Fourier Transform (IDFT) module (also called an IFFT module). The IDFT/IFFT module performs IDFT/IFFT on an antenna-specific symbol recovered by the resource element mapper, and thus outputs the IDFT/IFFT symbol to the multiplexer.

Figure 3:
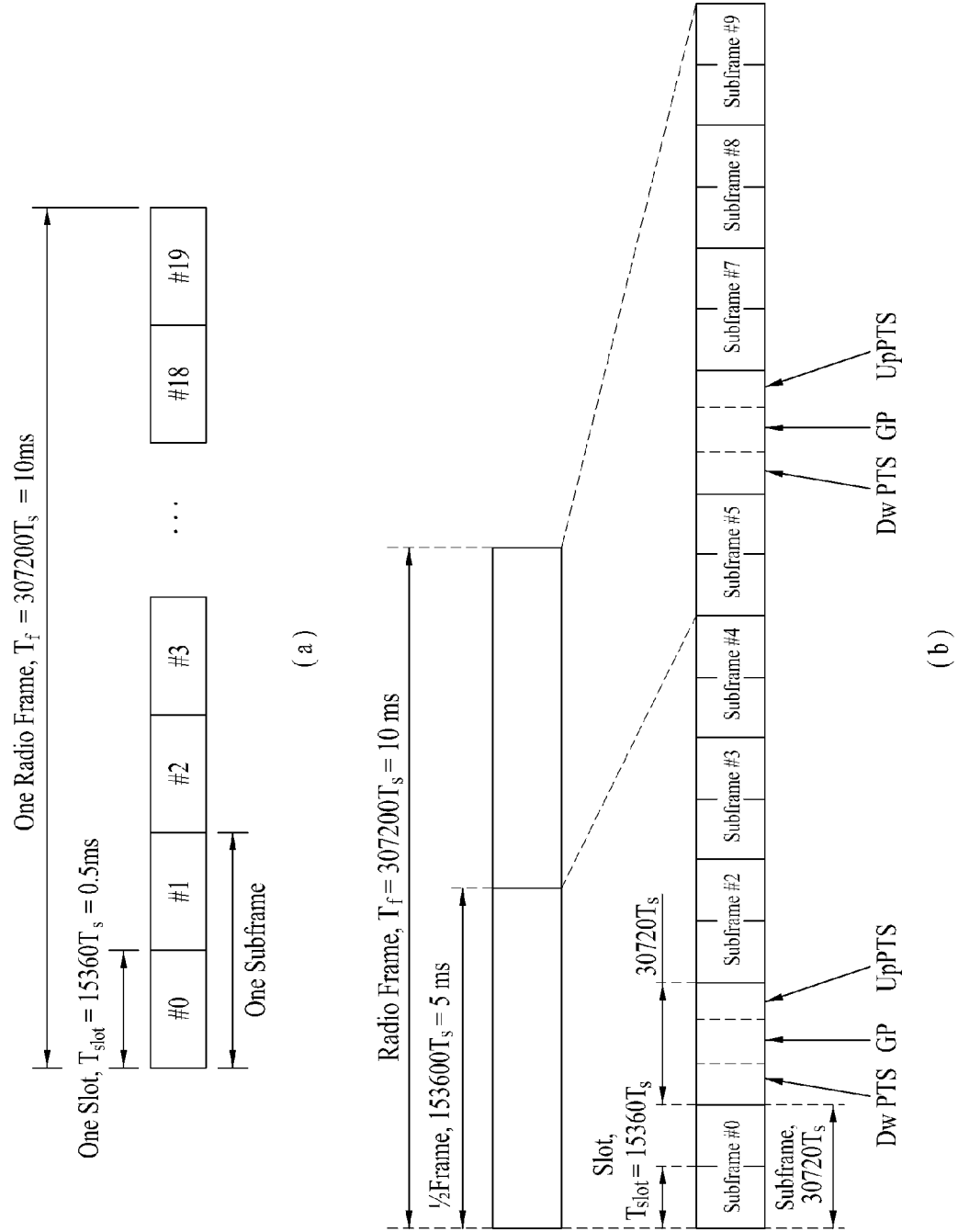
FIG. 3 illustrates an exemplary structure of a radio frame in a wireless communication system.

FIG. 3 illustrates an exemplary structure of a radio frame in a wireless communication system. Particularly, FIG. 3(a) illustrates a radio frame which may be applied to a Frequency Division Duplexing (FDD) in the 3GPP LTE(-A), and FIG. 3(b) may be applied to a Time Division Duplexing (TDD) in the 3GPP LTE(-A).

Referring to FIG. 3, a 3GPP LTE(-A) radio frame is 10 ms (307, 200$T_s$) in duration. The radio frame is divided into 10 equally-length subframes. Subframe numbers may be assigned to the 10 subframes within the radio frame, respectively. $T_s$ denotes sampling time, where $T_s=1/(2048*15\text{ kHz})$. Each subframe is 1 ms long and further divided into two slots. 20 slots are sequentially numbered from 0 to 19 in a radio frame. Duration of each slot is 0.5 ms. A time interval in which one subframe is transmitted is defined as a Transmission Time Interval (TTI). Time resources may be distinguished by a radio frame number (or radio frame index), a subframe number (or subframe index), a slot number (or slot index), and the like.

A radio frame may have different configurations according to duplex mode. In FDD mode for example, since DL transmission and UL transmission are discriminated according to frequency, a radio frame includes either DL subframes or UL subframes for a specific frequency band operating in a specific carrier frequency. In TDD mode, since DL transmission and UL transmission are discriminated according to time, a radio frame includes both DL subframes and UL subframes for a specific frequency band operating on a specific carrier frequency.

Table 1 shows an exemplary DL-UL configuration of subframes in a radio frame in TDD mode.

TABLE 1

| DL-UL config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D is a DL subframe, U is a UL subframe, and S is a special subframe. The special subframe denoted by S may include three fields, i.e., Downlink Pilot TimeSlot (DwPTS), Guard Period (GP), and Uplink Pilot TimeSlot (UpPTS). DwPTS is a time period reserved for DL transmission, and UpPTS is a time period reserved for UL transmission.

Figure 4:
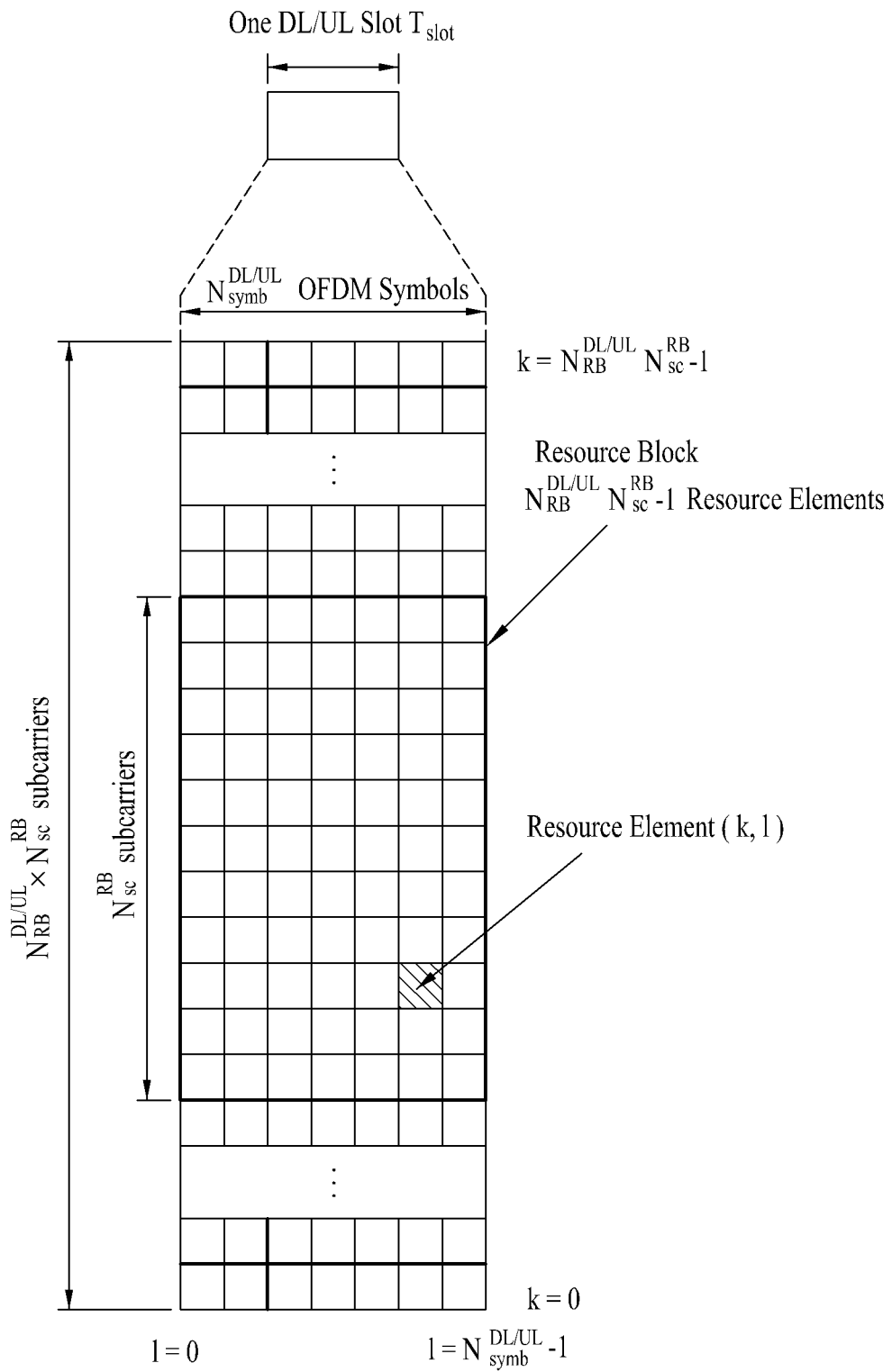
FIG. 4 illustrates an exemplary structure of a DownLink/UpLink (DL/UL) slot in the wireless communication system.

FIG. 4 illustrates an exemplary structure of a DownLink/UpLink (DL/UL) slot in the wireless communication system. Specifically, FIG. 4 illustrates the structure of a resource grid in the 3GPP LTE(-A) system. There is one resource grid per antenna port.

Referring to FIG. 4, a slot includes a plurality of OFDM symbols in the time domain by a plurality of Resource Blocks (RBs) in the frequency domain. An OFDM symbol may refer to one symbol duration. An RB includes a plurality of sub-carriers in the frequency domain. An OFDM symbol may be called an OFDM symbol, an SC-FDM symbol, etc. according to a multiple access scheme. The number of OFDM symbols per slot may vary depending on a channel bandwidth and a CP length. For instance, one slot includes 7 OFDM symbols in case of a normal CP, whereas one slot includes 6 OFDM symbols in case of an extended CP. While a subframe is shown in FIG. 4 as having a slot with 7 OFDM symbols for illustrative purposes, embodiments of the present invention are also applicable to subframes with any other number of OFDM symbols. Each element in the resource grid for an antenna port is called Resource Element (RE). Each RE is formed by one OFDM symbol by one subcarrier. An RE is also referred to as a tone.

Referring to FIG. 4, a signal transmitted in each slot may be described by a resource grid including $N^{DL/UL}_{RB} \cdot N^{RB}_{sc}$ subcarriers and $N^{DL/UL}_{symb}$ OFDM or SC-FDM symbols. $N^{DL}_{RB}$ represents the number of RBs in a DL slot and $N^{UL}_{RB}$ represents the number of RBs in a UL slot. $N^{DL}_{RB}$ is dependent upon a DL transmission bandwidth, and $N^{UL}_{RB}$ is dependent upon a UL transmission bandwidth. Each OFDM symbol includes $N^{DL/UL}_{RB} \cdot N^{RB}_{sc}$ subcarriers in a frequency domain. The number of subcarriers mapped to one carrier is determined according to the FFT size. The subcarriers may be classified into a data subcarrier for data transmission, a reference signal (RS) subcarrier for RS transmission, and a null subcarrier for a guard band and DC component. The null subcarrier for the DC component is an unused subcarrier, and is mapped to a carrier frequency ($f_0$) in an OFDM signal generation process. The carrier frequency may also be called a center frequency. $N^{DL}_{symb}$ represents the number of OFDM or SC-FDMA symbols in the DL slot and $N^{UL}_{symb}$ represents the number of OFDM or SC-FDMA symbols in the UL slot. $N^{RB}_{SC}$ represents the number of subcarriers in one RB. a Physical Resource Block (PRB) is defined as $I^{DL/UL}_{symb}$ consecutive OFDM symbols or SC-FDMA symbols in the time domain by $N^{RB}_{sc}$ consecutive subcarriers in the frequency domain. A RB is defined as $N^{DL/UL}_{symb}$ (e.g., 7) consecutive OFDM symbols or SC-FDMA symbols in the time domain by $N^{RB}_{sc}$ (e.g. 12) consecutive subcarriers in the frequency domain. Therefore, one RB includes $N^{DL/UL}_{symb} \cdot N^{RB}_{sc}$ REs. Each RE in the resource grid per each antenna port may be uniquely identified by an index pair (k, l) in a slot. k is a frequency-domain index ranging from 0 to $N^{DL/UL}_{RB} \cdot N^{RB}_{sc}-1$ and l is a time-domain index ranging from 0 to $N^{DL/UL}_{symb}-1$.

Figure 5:
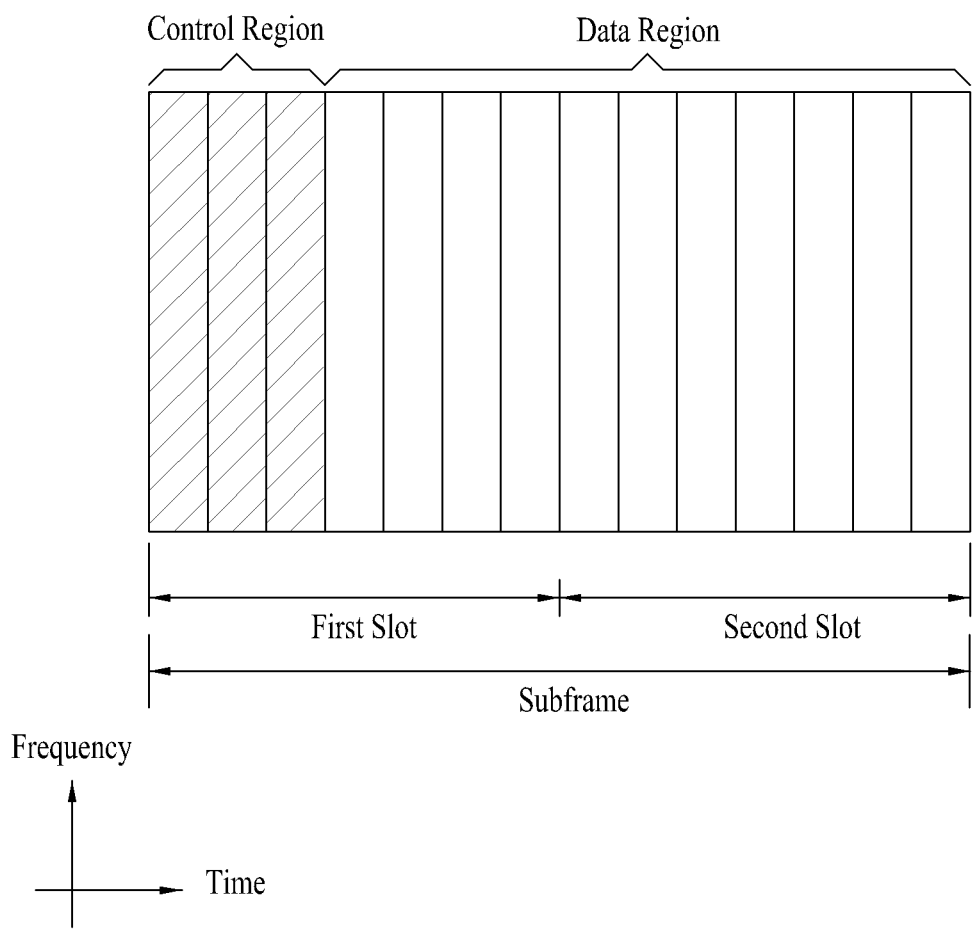
FIG. 5 illustrates an exemplary structure of a DL subframe used in the 3GPP LTE(-A) system.

FIG. 5 illustrates an exemplary structure of a DL subframe used in the 3GPP LTE(-A) system.

Referring to FIG. 5, each subframe may be divided into a control region and a data region. The control region includes one or more OFDM symbols, starting from the first OFDM symbol. In a DL subframe in the 3GPP LTE(-A) system, the control region is set to a region in which a PDCCH (Physical Downlink Control Channel) may be transmitted, and thus the control region in a DL subframe may be referred to as a PDCCH region. The number of OFDM symbols used for the control region of a DL subframe may be set independently on a subframe basis and signaled on a PCFICH (Physical Control Format Indicator CHannel). A BS may transmit control information to a UE or UEs in the control region. To transmit control information, a PDCCH, a PCFICH, a PHICH (Physical Hybrid automatic retransmit request Indicator CHannel), etc. may be allocated to the control region.

The BS may transmit information related to resource allocation of a PCH (Paging channel) and DL-SCH (Downlink-shared channel), an uplink scheduling grant, HARQ information, Downlink Assignment Index (DAI), Transmitter Power Control (TPC) command, etc. to each UE or each UE group on a PDCCH. Information related to resource assignment carried by a PDCCH may include RB assignment information, i.e. frequency resource information, used for UL/DL transmission. The BS may allocate frequency resources for a UE through the PDCCH.

The BS may transmit data to a UE or UE group in the data region. Data transmitted in the data region is referred to as user data. A PDSCH (Physical Downlink Shared CHannel) may be allocated to the data region to convey user data. PCH (Paging channel) and DL-SCH (Downlink-shared channel) may be transmitted on a PDSCH. A UE may decode control information received on a PDCCH and thus read data received on a PDSCH based on the decoded control information. The DCI carried by one PDCCH has different sizes and usages according to the PDCCH format, and the DCI size may be changed according to the coding rate. Information indicating to which UE or UE group PDSCH data is transmitted and information indicating how the UE or UE group should receive and decode the PDSCH data are transmitted on the PDCCH. For example, it is assumed that a specific PDCCH is CRC-masked with a Radio Network Temporary Identity (RNTI) called A, and information that is transmitted using radio resources B (for example, a frequency location) and transmission format information C (for example, a transmission block size, a modulation scheme, coding information, etc.), is transmitted through a specific subframe. In this case, a UE located in a cell monitors PDCCH using its own RNTI information. If at least one UE having the RNTI A is present, the UEs receive PDCCH and receive PDSCH indicated by B and C through the received PDCCH information.

Multiple PDCCHs may be transmitted in a control region. The UE monitors the multiple PDCCHs so as to detect its own PDCCH. Basically, however, since the UE is unaware of the position to which its own PDCCH is being transmitted, the UE performs blind detection (also referred to as blind decoding) on all PDCCHs having the corresponding DCI format for each subframe, until the PDCCH having its identifier is received.

Figure 6:
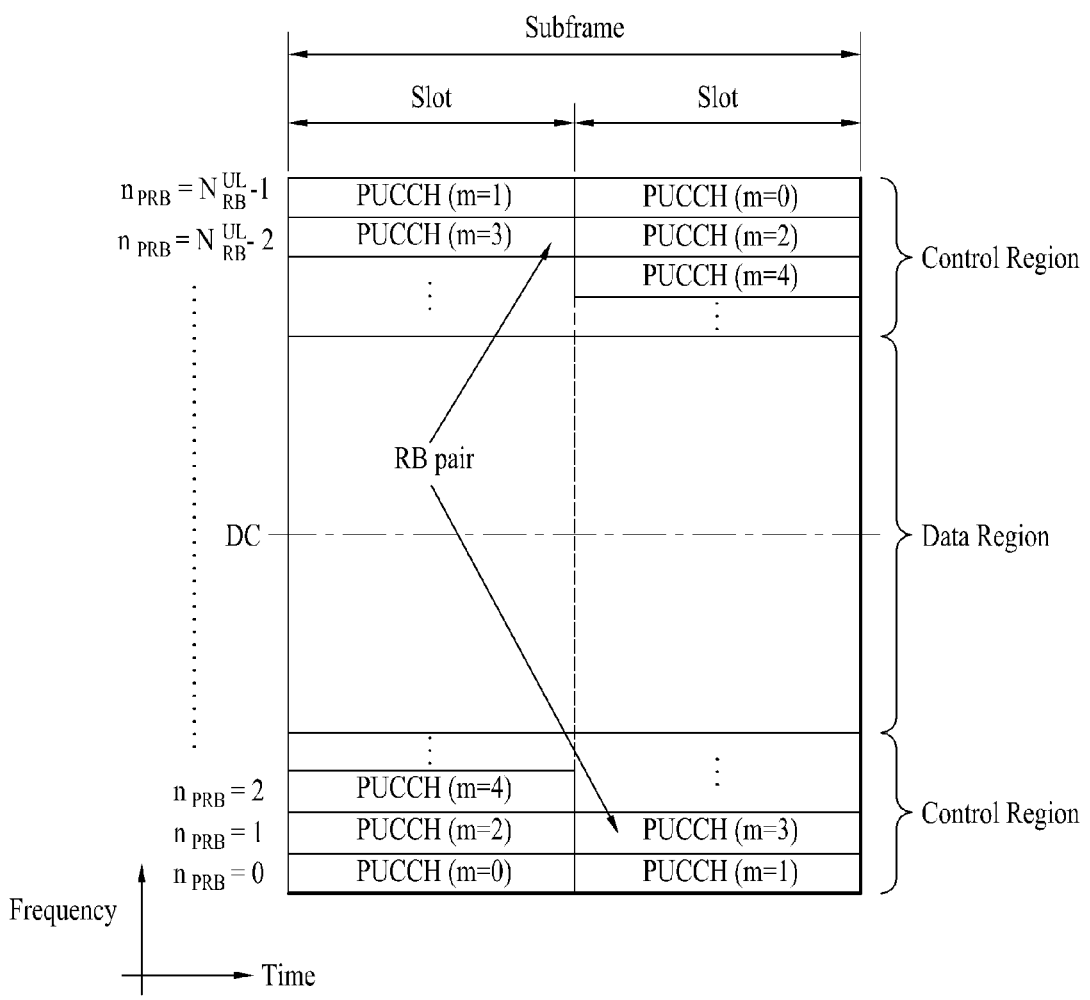
FIG. 6 illustrates an exemplary structure of a UL subframe used in the 3GPP LTE(-A) system.

FIG. 6 illustrates an exemplary structure of a UL subframe used in the 3GPP LTE(-A) system.

Referring to FIG. 6, a UL subframe may be divided into a data region and a control region in the frequency domain. One or more Physical Uplink Control CHannels (PUCCHs) may be allocated to the control region to carry Uplink Control Information (UCI). One or more Physical Uplink Shared Channels (PUSCHs) may be allocated to the data region to carry user data. If the UE adopts an SC-FDMA scheme for UL transmission, a PUCCH and a PUSCH cannot be simultaneously transmitted on a single carrier in a 3GPP LTE release-8 or release-9 system in order to maintain single-carrier characteristics. In a 3GPP LTE release-10 system, whether simultaneous transmission of the PUCCH and the PUSCH is supported may be indicated by a higher layer.

The UCI carried by one PUCCH has different sizes and usages according to the PUCCH format, and the UCI size may be changed according to the coding rate. For example, the PUCCH format may be defined as follows.

TABLE 2

| PUCCH format | Modulation scheme | Number of bits per subframe | Usage | Etc. |
| --- | --- | --- | --- | --- |
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + BPSK | 22 | CQI/PMI/RI + ACK/NACK | Normal CP only |
| 3 | QPSK | 48 | ACK/NACK or SR + ACK/NACK or CQI/PMI/RI + ACK/NACK | |

1-bit transmission bits or 2-bit transmission bits may be modulated into a complex-valued modulation symbol according to the following table to be transmitted on a PUCCH resource.

TABLE 3

| Modulation | Binary bits | Modulation symbol |
| --- | --- | --- |
| BPSK | 0 | 1 |
| | 1 | −1 |
| QPSK | 00 | 1 |
| | 01 | −j |
| | 10 | j |
| | 11 | −1 |

In a UL subframe, subcarriers distant from a DC (Direct Current) subcarrier may be used as a control region. In other words, subcarriers located at both ends of a UL transmission bandwidth are assigned for UL control information transmission. The DC subcarrier is reserved without being used for signal transmission and is mapped to a carrier frequency $f_0$ in a frequency up-conversion process.

A PUCCH for a UE is allocated to an RB pair, which belongs to resources operating in a carrier frequency, in a subframe. The RBs of the RB pair occupy different subcarriers in two slots. This is called frequency hopping of an RB pair allocated to a PUCCH over a slot boundary. However, if frequency hopping is not used, an RB pair occupies the same subcarriers. Irrespective of frequency hopping, a PUCCH for one UE is assigned to an RB pair in one subframe and therefore the same PUCCH is transmitted once through one RB in each slot, a total of two times, in one UL subframe. The UE is assigned a PUCCH resource for UCI transmission by the BS through higher layer signaling, an explicit scheme, or an implicit scheme.

Hereinafter, an RB pair used for PUCCH transmission in one subframe will be referred to as a PUCCH region or a PUCCH resource. In addition, among PUCCHs, a PUCCH carrying ACK/NACK will be referred to as an ACK/NACK PUCCH, a PUCCH carrying CQI/PMI/RI will be referred to as a Channel Station Information (CSI) PUCCH, and a PUCCH carrying SR will be referred to as an SR PUCCH, for convenience of description.

The UE is assigned a PUCCH resource for UCI transmission by the BS through higher layer signaling, an explicit scheme, or an implicit scheme.

UCI such as an ACK/NACK, a Channel Quality Indicator (CQI), a Precoding Matrix Indicator (PMI), Rank Information (RI), Scheduling Request (SR), etc. may be transmitted in a control region of a UL subframe.

Figure 7:
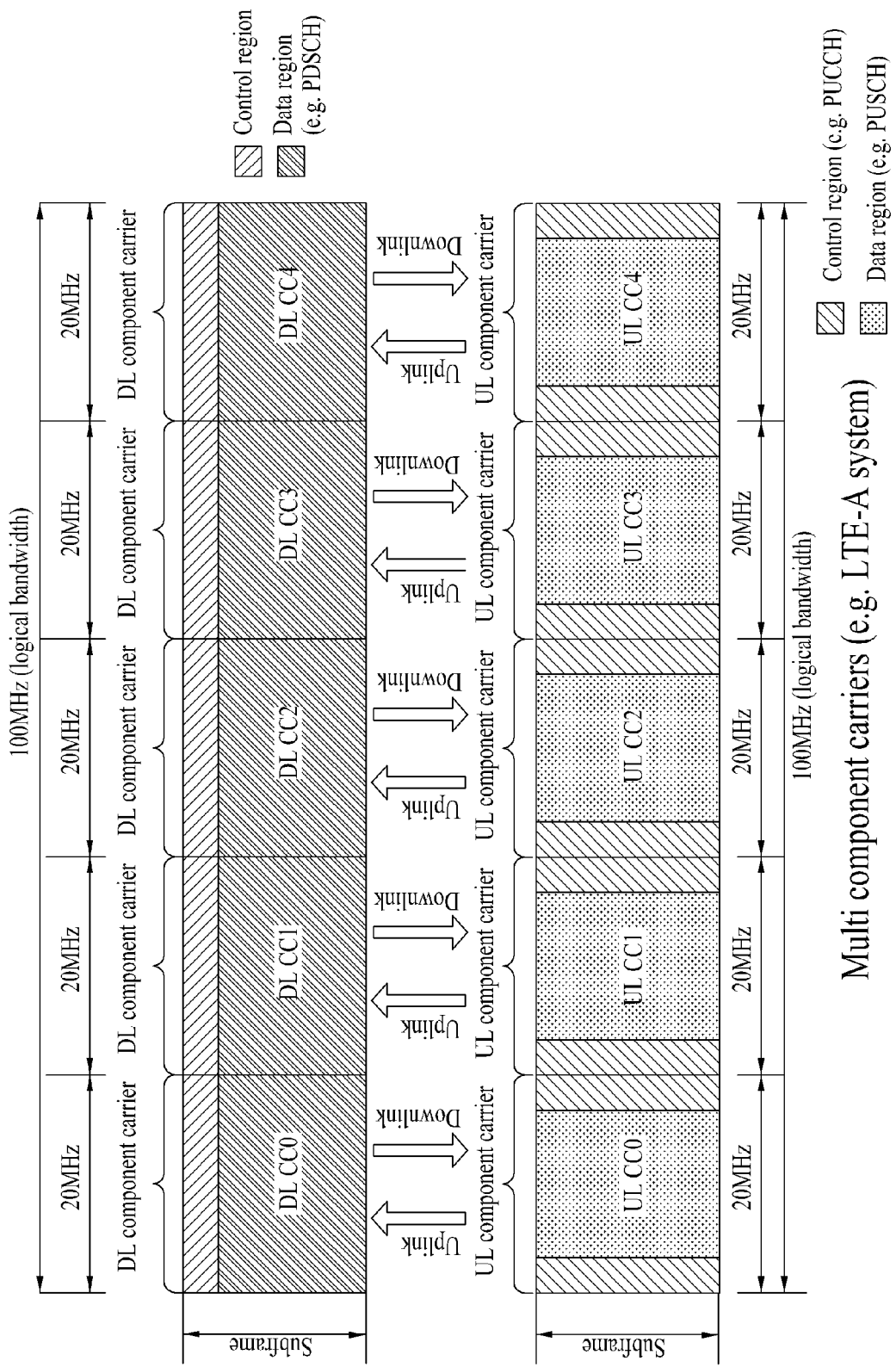
FIG. 7 illustrates an example of performing communication in a multicarrier situation.

FIG. 7 illustrates an example of performing communication in a multicarrier situation.

A general wireless communication system transmits/receives data through one downlink (DL) band and through one uplink (UL) band corresponding to the DL band (in case of Frequency Division Duplex (FDD) mode), or divides a prescribed radio frame into UL time unit(s) and DL time unit(s) in a time domain and transmits/receives data through the UL/DL time unit(s) (in case of Time Division Duplex (TDD) mode). A Base Station (BS) and a User Equipment (UE) transmit and receive data and/or control information scheduled on a prescribed time unit basis, i.e. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. Recently, to use a wider frequency band in a recent wireless communication system, introduction of carrier aggregation (or bandwidth aggregation) technology that uses a wider UL/DL bandwidth by aggregating a plurality of UL/DL frequency blocks has been discussed. Referring to FIG. 7, five CCs, each of 20 MHz, may be aggregated on each of UL and DL to support a bandwidth of 100 MHz. The respective CCs may be contiguous or non-contiguous in the frequency domain. For convenience, FIG. 7 shows the case in which the bandwidth of a UL CC is the same as the bandwidth of a DL CC and the two are symmetrical. However, the bandwidth of each CC may be independently determined. It is also possible to configure asymmetric CA in which the number of UL CCs is different from the number of DL CCs. A UL CC and a DL CC may also be referred to as UL resources and DL resources, respectively. Even when a BS manages X DL CCs, a frequency bandwidth which can be received by a specific UE may be limited to Y (≤X) DL CCs. In this case, the UE needs to monitor DL signals/data transmitted through the Y CCs. In addition, even when the BS manages L UL CCs, a frequency bandwidth which can be received by a specific UE may be limited to M (≤L) UL CCs. The limited DL/UL CCs for a specific UE are referred to as serving UL/DL CCs configured in the specific UE.

The BS may allocate a prescribed number of CCs to the UE by activating some or all of the CCs managed by the BS or by deactivating some CCs managed by the BS. The BS may change the activated/deactivated CCs and change the number of activated/deactivated CCs. Various parameters for CA may be configured cell-specifically, UE group-specifically, or UE-specifically. Once the BS allocates available CCs to the UE cell-specifically or UE-specifically, at least one of the allocated CCs is not deactivated, unless overall CC allocation to the UE is reconfigured or the UE is handed over. Hereinafter, the CC that is not deactivated unless overall CC allocation to the UE is reconfigured is referred to as a Primary CC (PCC) and a CC that the BS can freely activate/deactivate is referred to as a Secondary CC (SCC). Single carrier communication uses one PCC for communication between the UE and the BS and does not use the SCC for communication. Meanwhile, the PCC and SCC may also be distinguished based on control information. For example, specific control information may be configured to be transmitted/received only through a specific CC. Such a specific CC may be referred to as a PCC and the other CC (or CCs) may be referred to as an SCC (or SCCs). For instance, control information transmitted on a PUCCH may correspond to such specific control information. Thus, if control information transmitted on the PUCCH can be transmitted to the BS from the UE only through the PCC, a UL CC in which the PUCCH of the UE is present may be referred to as a UL PCC and the other UL CC (or CCs) may be referred to as a UL SCC (SCCs). As another example, if a UE-specific CC is used, the specific UE may receive a DL Synchronization Signal (SS) from the BS as specific control information. In this case, a DL CC with which the specific UE establishes synchronization of initial DL time by receiving the DL SS (i.e. a DL CC used for attempting to access a network of the BS) may be referred to as a DL PCC and the other DL CC (or CCs) may be referred to as a DL SCC (or SCCs).

Meanwhile, 3GPP LTE(-A) uses the concept of cells to manage radio resources. A cell is defined as a combination of DL resources and UL resources, that is, a combination of a DL CC and a UL CC. The cell can be configured of DL resources alone, or of both DL resources and UL resources. When CA is supported, a linkage between a carrier frequency of the DL resources (or DL CC) and a carrier frequency of the UL resources (or UL CC) may be indicated by system information. For example, a combination of the DL resources and the UL resources may be indicated by a System Information Block type 2 (SIB2) linkage. In FDD using different UL and DL operating bandwidths, different carrier frequencies are linked to constitute one serving CC (or one serving cell) and the SIB2 linkage indicates a frequency of a UL CC using a frequency different from a frequency of a DL CC accessed by the UE. In TDD using the same UL and DL operating bandwidth, one carrier frequency constitutes one serving CC and the SIB linkage indicates a frequency of a UL CC using the same frequency as a frequency of a DL CC accessed by the UE. Here, the carrier frequency refers to a center frequency of each cell or CC. A cell that operates on a primary frequency may be referred to as a Primary Cell (PCell) or SCC, and a cell that operates on a secondary frequency may be referred to as a Secondary Cell (SCell) or SCC.

The PCell refers to a cell used for the UE to perform an initial connection establishment or connection re-establishment procedure. PCell may refer to a cell indicated during a handover process. As another example, PCell may also refer to as a DL CC on which the UE receives a DL Synchronization Signal (SS) to acquire initial synchronization and a UL CC linked with the DL CC. A carrier corresponding to the PCell in DL is referred to as a DL primary CC (DL PCC) and a carrier corresponding to the PCell in UL is referred to as a UL primary CC (DL PCC). SCell refers to a cell which can be configured after Radio Resource Control (RRC) connection establishment and can be used to provide additional radio resources. According to capabilities of the UE, the SCell may form a set of serving cells together with PCell. The serving cell may be referred to as a serving CC. A carrier corresponding to the SCell in DL is referred to as a DL secondary CC (DL SCC) and a carrier corresponding to the SCell in UL is referred to as a UL secondary CC (UL SCC). Accordingly, for a UE in an RRC_CONNECTED state, for which CA is not configured or CA is not supported, only one serving cell comprised of only a PCell is present. Meanwhile, for a UE in an RRC_CONNECTED state, for which CA is configured, one or more serving cells may be present and the one or more serving cells may include one PCell and one or more SCells. For CA, a network may configure one or more SCells for a UE that supports CA in addition to the PCell initially configured in the connection establishment procedure after an initial security activation procedure is initiated. However, even if the UE supports CA, the network may configure only the PCell for the UE, without adding the SCells. A PCell may be referred to as a primary CC (PCC), an anchor CC, or a primary carrier and a SCell may be referred to as a secondary CC (SCC) or a secondary carrier.

FIG. 8 to FIG. 11 exemplarily show slot level structures of PUCCH formats.

Figure 8:
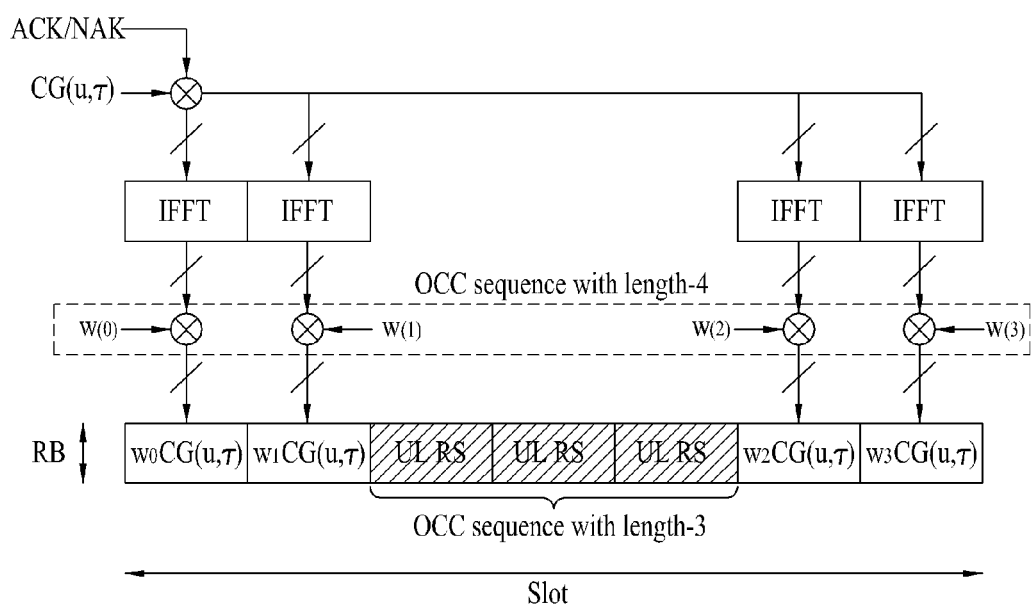
FIG. 8 to FIG. 11 exemplarily show slot level structures of PUCCH formats.
Figure 9:
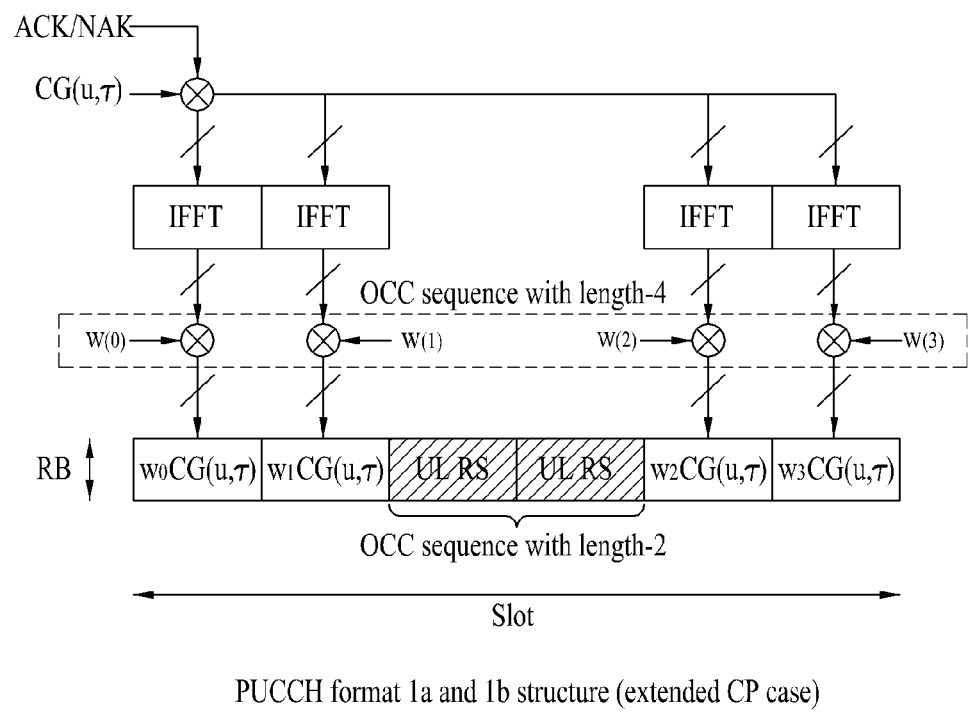

FIG. 8 shows the PUCCH format 1a and 1b structure in case of a normal CP. FIG. 9 shows the PUCCH format 1a and 1b structure in case of the extended CP. In the PUCCH format 1a and 1b structure, the same control information is repeated per slot within a subframe. In each UE, the ACK/NACK signal may be transmitted through different resources that are comprised of different cyclic shifts (i.e., different frequency domain codes) of a Computer-Generated Constant Amplitude Zero Auto Correlation (CG-CAZAC) sequence and different resources composed of orthogonal cover or orthogonal cover code (OC or OCC). For example, OC may include a Walsh/DFT orthogonal code. Provided that the number of CSs is 6 and the number of OCs is 3, a total of 18 UEs may be multiplexed in the same PRB on the basis of one antenna. Orthogonal sequences [w(0) w(1) w(2) w(3)] may be applied to either an arbitrary time domain (after FFT modulation) or an arbitrary frequency domain (before FFT modulation).

For an SR and persistent scheduling, ACK/NACK resources including CSs, OC sequences, and PRBs may be provided to a UE through RRC. For dynamic ACK/NACK and non-persistent scheduling, ACK/NACK resources may be implicitly provided to the UE by the lowest Control Channel Element (CCE) index of a PDCCH corresponding to a PDSCH.

Figure 10:
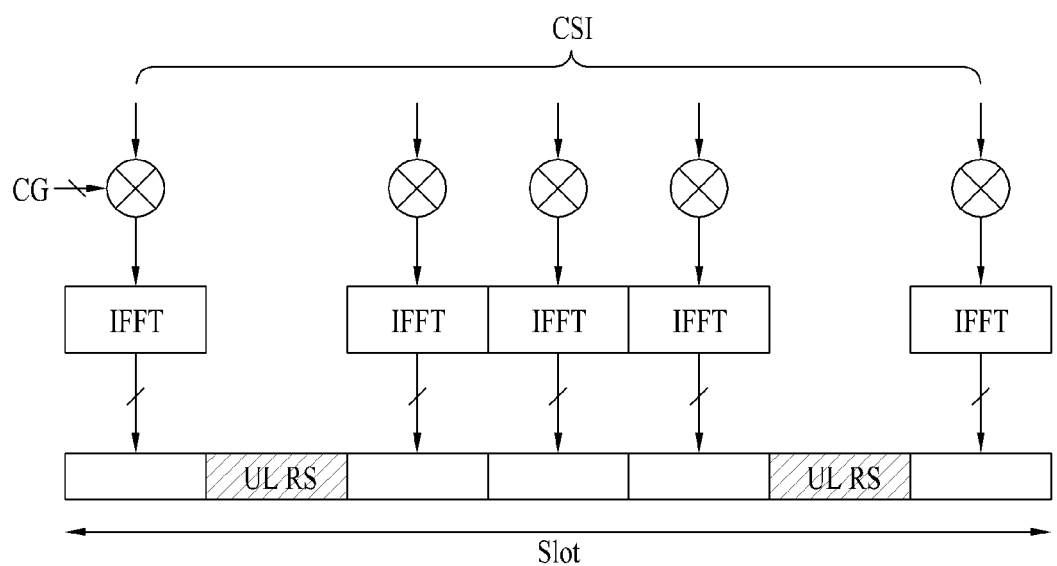
Figure 11:
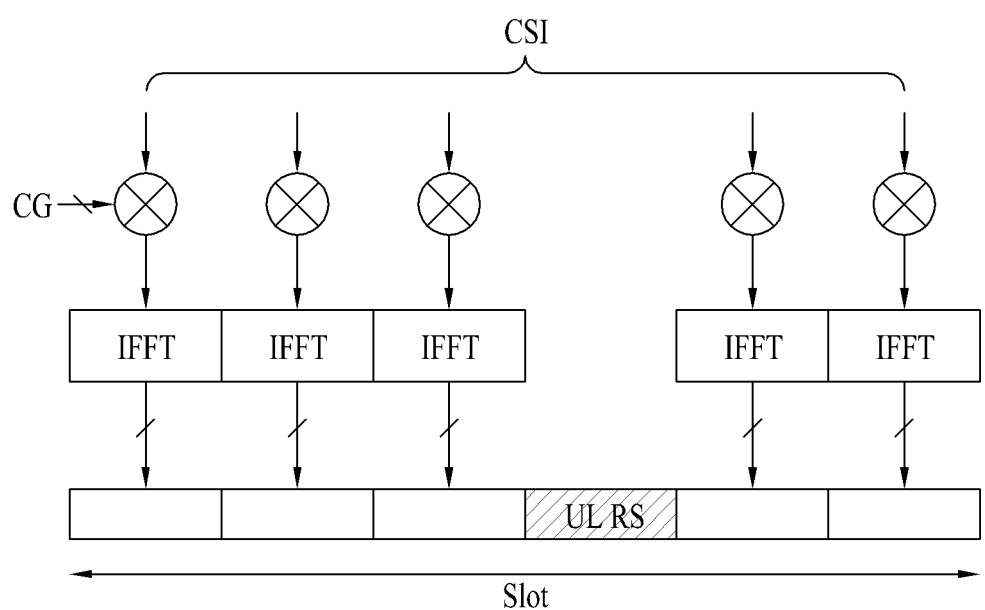

FIG. 10 illustrates PUCCH format 2/2a/2b in a normal CP. FIG. 11 illustrates PUCCH format 2/2a/2b in an extended CP. Referring to FIGS. 10 and 11, one subframe with the normal CP includes 10 QPSK data symbols in addition to RS symbols. Each of the QPSK symbols is spread by a CS in the frequency domain and then mapped to a corresponding SC-FDMA symbol. CS hopping of an SC-FDMA symbol level may be applied for randomization of inter-cell interference. An RS may be multiplexed by CDM using a CS. For example, assuming that the number of available CSs is 12 or 6, 12 or 6 UEs may be multiplexed in the same PRB. In summary, a plurality of UEs may be multiplexed by CSs, OCs, and PRBs in PUCCH format 1/1a/1b and by CSs and PRBs in PUCCH format 2/2a/2b.

Length-4 and length-3 orthogonal sequences (OC sequences) for PUCCH format 1/1a/1b are shown in Table 4 and Table 5, respectively, below. Specifically, Table 4 shows orthogonal sequences for $N^{PUCCH}_{SF}=4$ and Table 5 shows orthogonal sequences for $N^{PUCCH}_{SF}=3$.

TABLE 4

| Sequence index $n^{(p)}_{oc}(n_s)$ | Orthogonal sequences $[w(0) \ldots w(N^{PUCCH}_{RS} - 1)]$ |
| --- | --- |
| 0 | [+1 +1 +1 +1] |
| 1 | [+1 −1 +1 −1] |
| 2 | [+1 −1 −1 +1] |

TABLE 5

| Sequence index $n^{(p)}_{oc}(n_s)$ | Orthogonal sequences $[w(0) \ldots w(N^{PUCCH}_{RS} - 1)]$ |
| --- | --- |
| 0 | [+1 +1 +1] |
| 1 | $[+1 \; +e^{j2\pi/3} \; +e^{j4\pi/3}]$ |
| 2 | $[+1 \; +e^{j4\pi/3} \; +e^{j2\pi/3}]$ |

OC sequences for an RS in PUCCH format 1a/1b are as follows.

TABLE 6

| | Orthogonal sequences $[w(0) \ldots w(N^{PUCCH}_{RS} - 1)]$ | |
| --- | --- | --- |
| Sequence index $n^{(p)}_{oc}(n_s)$ | Normal cyclic prefix | Extended cyclic prefix |
| 0 | [+1 +1 +1] | [+1 +1] |
| 1 | $[+1 \; +e^{j2\pi/3} \; +e^{j4\pi/3}]$ | [+1 −1] |
| 2 | $[+1 \; +e^{j4\pi/3} \; +e^{j2\pi/3}]$ | N/A |

Figure 12:
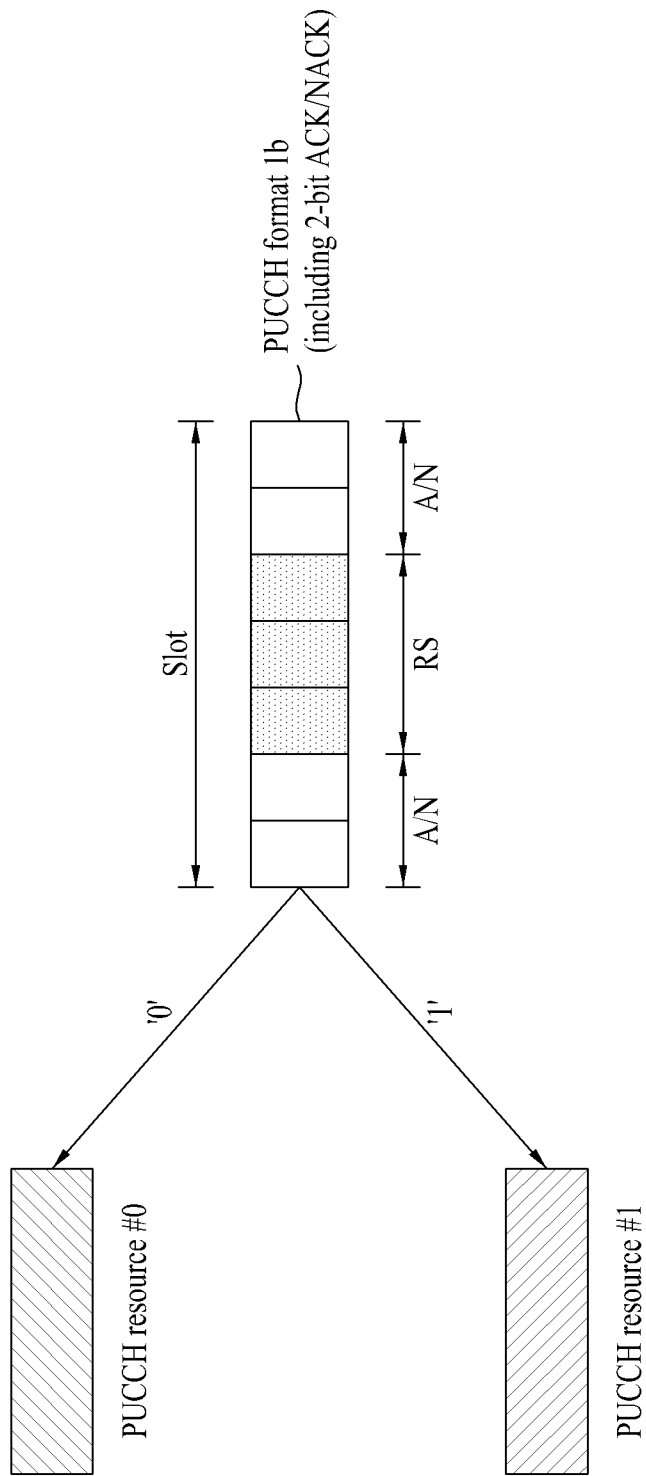
FIGS. 12 and 13 show exemplary ACKnowledgement/Negative ACK (ACK/NACK) transmission based on channel selection.
Figure 13:
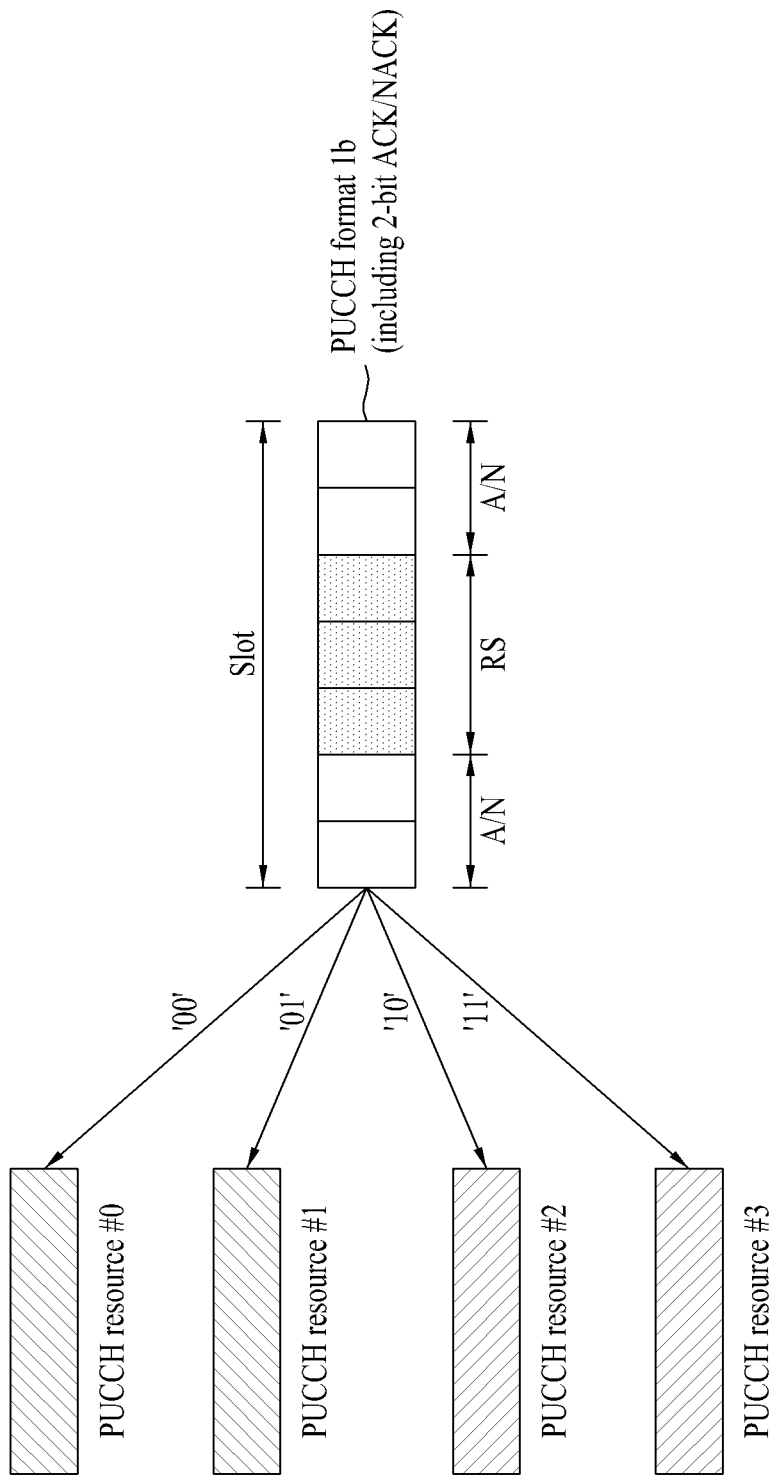

FIGS. 12 and 13 show exemplary ACK/NACK transmission based on channel selection.

A scheme for transmitting information by data constellation and by selection of specific resources among a plurality of resources defined using RSs and data is referred to as a channel selection transmission scheme. Referring to FIG. 12, for example, two PUCCH resources (PUCCH resources #0 and #1) may be configured for PUCCH format 1b for 2-bit ACK/NACK feedback. If 3-bit ACK/NACK information is transmitted, 2 bits among the 3-bit ACK/NACK information may be expressed through PUCCH format 1b and the other 1 bit may be expressed according to which one of the two resources is selected. For example, it may be predefined that transmission of UCI using PUCCH resource #0 indicates '0' and transmission of the UCI using PUCCH resource #1 indicates '1'. Therefore, since one bit (0 or 1) may be expressed by selecting one of the two PUCCH resources, additional 1-bit ACK/NACK information may be expressed in addition to 2-bit ACK/NACK information expressed through PUCCH format 1b.

Referring to FIG. 13, four PUCCH resources (PUCCH resources #0 to #4) may be configured for PUCCH format 1b for 2-bit ACK/NACK feedback. If 4-bit ACK/NACK information is transmitted, 2 bits among the 4-bit ACK/NACK information may be expressed through 2-bit information carried by PUCCH format 1b and the other 2 bits may be expressed according to which resource of the four resources is selected. For example, it may be predefined that transmission of UCI using PUCCH resource #0 indicates '00' and transmission of the UCI using PUCCH resource #1 indicates '01'. Therefore, since two bits (00, 01, 10, or 11) may be expressed by selecting one of the four PUCCH resources, additional 2-bit ACK/NACK information may be expressed in addition to 2-bit ACK/NACK information expressed through PUCCH format 1b.

Which bit should be transmitted on which PUCCH resource may be predetermined according to ACK/NACK states. That is, a mapping table of ACK/NACK state versus PUCCH resources versus transmission bits (or complex modulation symbols) may be predefined and may be pre-stored in a BS and a UE. The following Table 7 shows a table defined for 3-bit ACK/NACK information and Table 7 shows a table defined for 4-bit ACK/NACK information.

TABLE 7

| ACK/NACK state | Ch0 | | Ch1 | |
|---|---|---|---|---|
| | RS | Data | RS | Data |
| N, N, N | 1 | 1 | | |
| N, N, A | 1 | -j | | |
| N, A, N | 1 | j | | |
| N, A, A | 1 | -1 | | |
| A, N, N | | | 1 | 1 |
| A, N, A | | | 1 | -j |
| A, A, N | | | 1 | j |
| A, A, A | | | 1 | -1 |

TABLE 8

| ACK/NACK state | Ch0 | | Ch1 | | Ch2 | | Ch3 | |
|---|---|---|---|---|---|---|---|---|
| | RS | Data | RS | Data | RS | Data | RS | Data |
| NNNN | 1 | 1 | | | | | | |
| NNNA | 1 | -j | | | | | | |
| NNAN | 1 | j | | | | | | |
| NNAA | 1 | -1 | | | | | | |
| NANN | | | 1 | 1 | | | | |
| NANA | | | 1 | -j | | | | |
| NAAN | | | 1 | j | | | | |
| NAAA | | | 1 | -1 | | | | |
| ANNN | | | | | 1 | 1 | | |
| ANNA | | | | | 1 | -j | | |
| ANAN | | | | | 1 | j | | |
| ANAA | | | | | 1 | -1 | | |
| AANN | | | | | | | 1 | 1 |
| AANA | | | | | | | 1 | -j |
| AAAN | | | | | | | 1 | j |
| AAAA | | | | | | | 1 | -1 |

In Table 7, Ch0 and Ch1 correspond one by one to orthogonal resources reserved for channel selection for 3-bit ACK/NACK information and, in FIG. 8, Ch0, Ch2, Ch3 and Ch4 correspond one by one to orthogonal resources reserved for channel selection for 4-bit ACK/NACK information. "A" denotes ACK and "N" denotes NACK. In addition, "1", "−1", "j", and "−j" indicate modulation symbols or constellations of the modulation symbols and blanks mean that ACK/NACK modulation symbols are not mapped on corresponding channels.

The BS may configure PUCCH resources for channel selection (Ch0 and Ch1 of Table. 7 or Ch0, Ch1, Ch2, and Ch3 of Table 8) and signal the configured resources to the UE. PUCCH resource candidate sets are previously provided from the BS to the UE through higher layer (e.g. RRC) signaling and which one of the PUCCH resource candidate sets can be used for ACK/NACK transmission may be indicated by an ACK/NACK Resource Indicator (ARI) value in one or more PDCCHs. The BS may transmit the ARI value to the UE by reusing a TPC command field or a DAI field in a PDCCH. The UE may detect the PDCCH(s) transmitted therefor and determine a PUCCH resource to be used for ACK/NACK transmission based on the ARI value in the detected PDCCH(s).

Hereinabove, description has mainly been given of the case in which channel selection is used for ACK/NACK transmission. However, channel selection may be applied to other UCI as well as ACK/NACK information. Notably, embodiments of the present invention will be described by way of example in which channel selection is applied to ACK/NACK transmission, for convenience of description.

Figure 14:
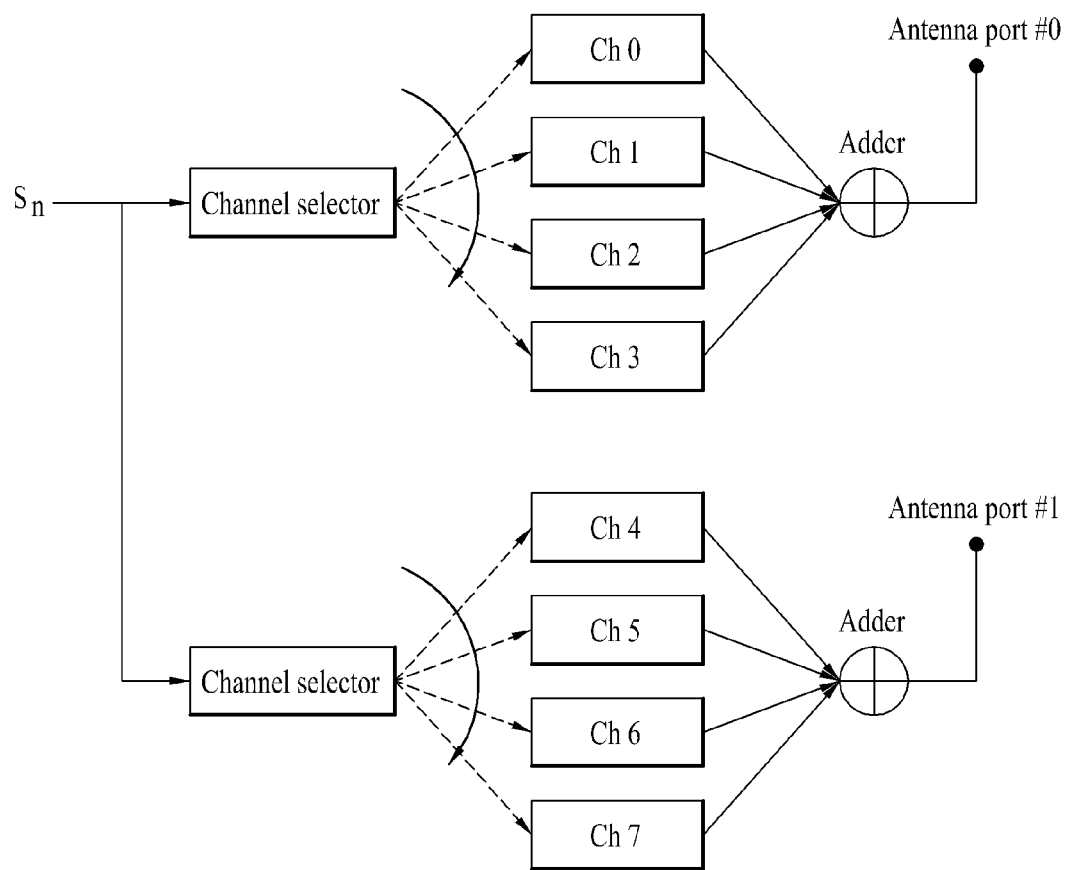
FIG. 14 illustrates an information transmission method using channel selection and Spatial Orthogonal-Resource Transmit Diversity (SORTD)

FIG. 14 illustrates an information transmission method using channel selection and Spatial Orthogonal-Resource Transmit Diversity (SORTD).

In a 3GPP LTE-A system, all of PUCCH formats 1/1a/1b, 2, and 3 may independently support SORTD. SORTD supported by each PUCCH format may be independently configured for each UE through RRC signaling to each UE. SORTD refers to a transmission scheme for transmitting the same information using a plurality of physical resources (code, time, and/or frequency regions). Unlike a 3GPP LTE system in which the UE supports only one transmit antenna port, the UE may support more than one transmit antenna port in the 3GPP LTE-A system. Therefore, in the 3GPP LTE-A system, SORTD supporting up to multiple transmit antenna ports for PUCCH transmission may be used. For transmit diversity gain, channel selection may be used together with SORTD. If SORTD is used together with channel selection, a predetermined number of orthogonal resources should be reserved (or used) for channel selection for each transmit antenna participating in SORTD. Hence, the number of orthogonal resources reserved for channel selection is increased in to the number of transmit antennas participating in SORTD when compared with the case in which a single transmit antenna (1Tx) is used. For example, if 4 orthogonal resources are reserved for 1Tx channel selection, 8 orthogonal resources, which double the 4 orthogonal resources reserved for 1Tx channel selection, are reserved for 2Tx SORTD and are used for UCI transmission.

Referring to FIG. 14, if a constellation signal corresponding to a modulation symbol mapped to a selected channel during channel selection is $s_n$, channel selectors corresponding respectively to two antenna ports select channels for the constellation signal $s_n$ by applying the same rule. For example, each channel selector selects a channel carrying the constellation signal $s_n$ according to a mapping table. In this case, the same mapping table is applied to the two antenna ports. The constellation signal $s_n$ is transmitted through corresponding antenna ports on channels selected by the channel selectors.

Table 9 to Table 11 show examples to which SORTD is applied in channel selection when ACK/NACK information is 2 bits, 3 bits, and 4 bits, respectively.

TABLE 9

| | Antenna port #0 | | Antenna port #1 | |
|---|---|---|---|---|
| State | Ch0 | Ch1 | Ch2 | Ch3 |
| NN | +1 | | +1 | |
| NA | | +1 | | +1 |
| AN | −1 | | −1 | |
| AA | | −1 | | −1 |

TABLE 10

| | Antenna port #0 | | | Antenna port #1 | | |
|---|---|---|---|---|---|---|
| State | Ch0 | Ch1 | Ch2 | Ch3 | Ch4 | Ch5 |
| NNN | 1 | | | 1 | | |
| NNA | −j | | | −j | | |
| NAN | j | | | j | | |
| NAA | | 1 | | | 1 | |
| ANN | 1 | | | 1 | | |
| ANA | −j | | | −j | | |
| AAN | j | | | j | | |
| AAA | | | −1 | | | −1 |

TABLE 11

| | Antenna port #0 | | | | Antenna port #1 | | | |
|---|---|---|---|---|---|---|---|---|
| State | Ch0 | Ch1 | Ch2 | Ch3 | Ch4 | Ch5 | Ch6 | Ch7 |
| NNNN | 1 | | | | 1 | | | |
| NNNA | −j | | | | −j | | | |
| NNAN | j | | | | j | | | |
| NNAA | −1 | | | | −1 | | | |
| NANN | | 1 | | | | 1 | | |
| NANA | | −j | | | | −j | | |
| NAAN | | j | | | | j | | |
| NAAA | | −1 | | | | −1 | | |
| ANNN | | | 1 | | | | 1 | |
| ANNA | | | −j | | | | −j | |
| ANAN | | | j | | | | j | |
| ANAA | | | −1 | | | | −1 | |
| AANN | | | | 1 | | | | 1 |
| AANA | | | | −j | | | | −j |
| AAAN | | | | j | | | | j |
| AAAA | | | | −1 | | | | −1 |

Referring to FIG. 14 and Table 11, if an ACK/NACK state is, for example, "NANA", the transmitting device 10 transmits a modulation symbol −j through antenna port #0 on Ch1 corresponding to "NANA" among resources Ch0, Ch1, Ch2, and Ch3 for channel selection of antenna port #0 and transmits a modulation symbol −j through antenna port #1 on Ch5 corresponding to "NANA" among resources Ch4, Ch5, Ch6, and Ch7 for channel selection of antenna port #1, thereby transmitting ACK/NACK information corresponding to "NANA" to the receiving device 20. The receiving device 20 may recognize that the ACK/NACK information transmitted by the transmitting device 20 is "NANA", based on the channel Ch1 or Ch5 on which the modulation symbol −j is received/detected.

The following Table 12 shows a comparison between performance of 1Tx ACK/NACK transmission and performance of 2Tx SORTD ACK/NACK transmission using Table 9 to Table 11.

TABLE 12

| | | 2-bit ACK/NACK | 3-bit ACK/NACK | 4-bit ACK/NACK |
|---|---|---|---|---|
| 1 Tx | Number of used resources | 2 | 3 | 4 |
| | Required SNR [dB] (ETU3 kmph/EPA3 km/h) | −6.50 dB/−7.34 dB | −6.14 dB/−6.78 dB | −5.77 dB/−6.34 dB |
| | SNR gain over 1 Tx [dB] (ETU3 kmph/EPA3 km/h) | 0 dB/0 dB | 0 dB/0 dB | 0 dB/0 dB |
| SORTD | Number of used resources | 4 | 6 | 8 |
| | Required SNR [dB] (ETU3 kmph/EPA3 km/h) | −7.68 dB/−8.10 dB | −7.16 dB/−7.76 dB | −7.05 dB/−7.55 dB |
| | SNR gain over 1 Tx [dB] (ETU3 kmph/EPA3 km/h) | 1.17 dB/0.76 dB | 1.02 dB/0.98 dB | 1.28 dB/1.21 dB |

In Table 12, a required SNR indicates a maximum Signal-to-Noise Ratio (SNR) satisfying the following ACK/NACK performance criteria.

Probability that Discontinuous Transmission (DTX) is determined to be ACK is not greater than 1%. That is, a DTX-to-ACK probability is less than or equal to 1%.

An ACK misdetection probability, i.e. probability that ACK is determined to be NACK or DTX is not greater than 1%. Namely, the ACK misdetection probability is less than or equal to 1%.

Probability that NACK is determined to be ACK is not greater than 0.1%. Namely, a NACK-to-ACK probability is less than or equal to 0.1%.

Since less transmit power is needed as the required SNR decreases, this means that a transmission scheme having the required SNR of a small value exhibits better performance. As can be appreciated from an experimental result of Table 13, SORTD has an SNR gain of a maximum of 1.28 dB compared with 1Tx transmission.

The number of available orthogonal resources is associated with the number of multiplexed UEs. In case of PUCCH format 1a/1b for example, when $\Delta^{PUCCH}_{shift}$ signaled by a higher layer is 2, the number of available CSs in one PRB is 6, the number of OC sequences of a data symbol is 4, and the number of OC sequences of an RS symbol is 3. In this case, since multiplexing capacity for one PRB is restricted by the smaller of the number of RS symbols and the number of data symbols, the multiplexing capacity is restricted by the RS symbols. Accordingly, a total of 18 (=6*3) UEs may be multiplexed per PRB. Meanwhile, if 2Tx SORTD is applied to PUCCH format 1a/1b, multiplexing capacity is reduced by 50%. When $\Delta^{PUCCH}_{shift}=2$, UEs performing 1Tx transmission may be multiplexed by up to 18, whereas UEs performing 2Tx SORTD transmission may be multiplexed by up to 9 in one PRB.

In case of channel selection using PUCCH format 1a/1b, when $\Delta^{PUCCH}_{shift}=2$, UEs transmitting 4-bit ACK/NACK information using 1Tx transmission may be multiplexed by up to 2.25 per PRB. If SORTD of 3Tx or more is used, resource overhead occurs in proportion to the number of antennas participating in SORTD. In summary, although good transmission performance can be guaranteed by SORTD transmission, there is a trade-off of reducing multiplexing capacity.

Hereinafter, a transmit diversity scheme for channel selection, which reduces decrease of multiplexing capacity and exhibits transmission performance corresponding to SORTD, according to the present invention will be described.

In channel selection, an information state is determined by a selected channel and a constellation to which information in the selected channel is modulated, i.e. a signal constellation of the selected channel. In other words, the information state is expressed as a combination of a selection domain for the selected channel and a constellation domain of the selected domain. However, ACK/NACK bit performance in channel selection is not uniform in the selection domain and the constellation domain. Typically, performance of information transmitted in the selection domain is better than performance of information transmitted in the constellation domain. According to an experimental result, if 2-bit ACK/NACK information is transmitted by PUCCH format 1b and channel selection using two orthogonal resources, the required SNR of PUCCH format 1b is −5.47 dB and channel selection using the two orthogonal resources is −7.04 dB. As a result, channel selection has an SNR gain of about 1.57 dB. This is because PUCCH format 1b distinguishes information by a BPSK signal on the constellation domain of one orthogonal resource and channel selection, through which fixed symbols are transmitted, distinguishes information by selecting one of two orthogonal resources. Overall ACK/NACK performance is restricted by a domain having poor performance among total domains. Accordingly, overall ACK/NACK performance depends on performance of the constellation domain. Meanwhile, the number of orthogonal resources used in channel selection affects a threshold value for DTX detection in the receiving device. As the number of orthogonal resources used for channel selection increases, since the processor 10 of the receiving device 20 performs processing for DTX detection on more available resources, the amount of noise components having an influence on DTX detection increases in proportion to the number of resources. Then, a required threshold value for a DTX-to-ACK error rate of incorrectly detecting DTX as ACK also increases. If the threshold value increases during DTX detection, ACK/NACK detection performance deteriorates in inverse proportion thereto. For example, an ACK-to-NACK/DTX error of incorrectly detecting ACK as NACK/DTX and a NACK-to-ACK error of incorrectly detecting NACK as ACK increase. To solve such problems, the present invention partially applies SORTD (partial SORTD) only to a channel to which a complex modulation symbol is mapped.

In an embodiment of the present invention, channel selection is performed using M+k orthogonal resources (where $1 \leq k \leq M^*(N_{TX}-1)$) with respect to $N_{TX}$ transmit antenna ports. Here, M is the number of orthogonal resources used (or reserved) for 1Tx channel selection. That is, if M=4, 2Tx SORTD achieves transmit diversity using 8 (=2*4) orthogonal resources. However, according to this embodiment, 2Tx transmit diversity is implemented using 5 (=4+1) orthogonal resources when k=1 or using 6 (=4+2) orthogonal resources when k=2. In summary, unlike SORTD additionally using orthogonal resources corresponding to the number of antenna ports, the present invention implements transmit diversity by adding only partial orthogonal resources. k may be predefined or may be configured by higher layer signaling.

In another embodiment of the present invention, channel selection is performed using $M+n^*(N_{TX}-1)$ orthogonal resources with respect to $N_{TX}$ transmit antennas. Here, M is the number of orthogonal resources used (or reserved) for 1Tx channel selection and n may correspond to the number of channels selected for information transmission in channel selection. In this case, modulation of a complex signal may be performed upon a selected channel. In conventional channel selection, since one channel among a total of M channels is selected, n may be 1. If this embodiment is applied when $N_{TX}=2$, M=4, and n=1, then 5 (=4+1*(2−1)) orthogonal resources are used for transmit diversity. n may be any non-negative integer. n may be predefined or may be configured by higher layer signaling.

In the embodiments of the present invention, resources added for transmit diversity may be configured by UE-specific RRC signaling. A BS may configure a plurality of resources through RRC signaling, designate resources to be additionally used in a corresponding subframe using a TPC field in a PDCCH for a PDSCH of a SCell, and signal the designated resources to a UE.

Figure 15:
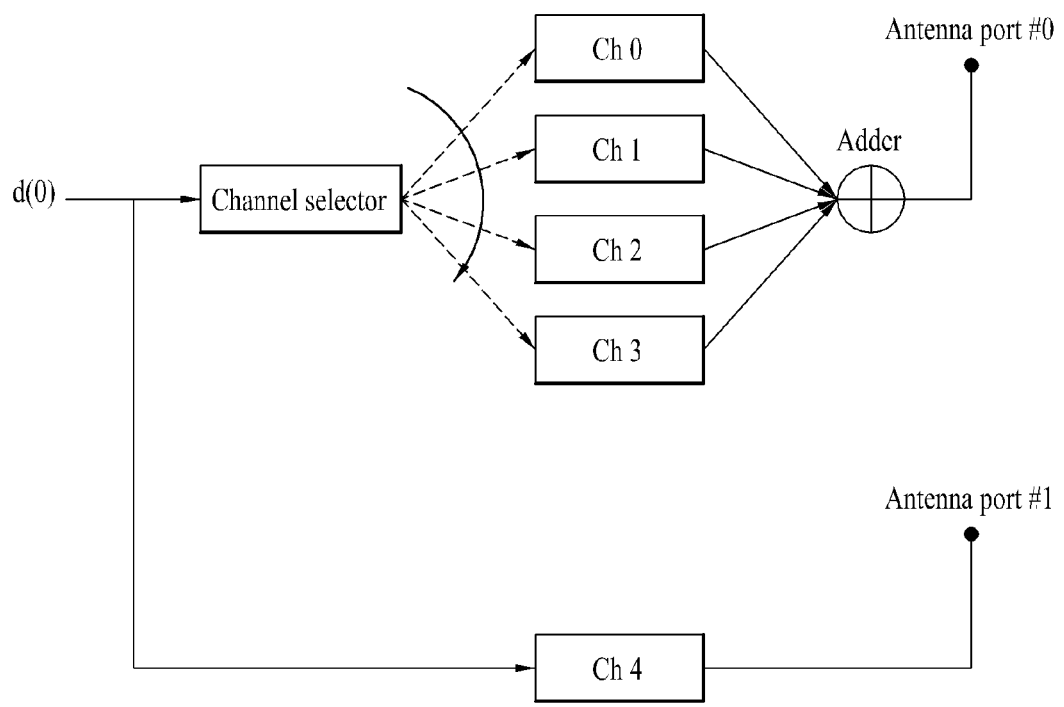
FIG. 15 illustrates a transmit diversity scheme according to an embodiment of the present invention.

FIG. 15 illustrates a transmit diversity scheme according to an embodiment of the present invention.

Referring to FIG. 15, a modulation symbol d(0) determined by ACK/NACK information is transmitted through antenna port #0 on a channel selected based on the (ACK/NACK) information among channels Ch0, Ch1, Ch2, and Ch3 and is transmitted through antenna port #1 on an additionally allocated resource Ch4. If a channel selected on antenna port #0 is Ch1, this may be interpreted that partial SORTD using Ch2 and Ch4 is applied to the modulation symbol d(0) from the viewpoint of the modulation symbol d(0). Alternatively, it may be interpreted that the modulation symbol d(0) determined according to the (ACK/NACK) information for channel selection is transmitted through antenna port #0 by channel selection of the same scheme as 1Tx transmission and is transmitted on another resource, Ch4, through antenna port #1 without processing of a channel selector.

The mapping relationship between ACK/NACK information indicating an ACK/NACK state, a modulation symbol, a channel, and an antenna port may be predefined between the BS and the UE. The UE may determine a modulation symbol, a channel carrying the modulation symbol, and an antenna port transmitting the modulation symbol on the channel, according to the predefined mapping relationship. The BS may be aware of ACK/NACK information using a channel on which an ACK/NACK signal transmitted by the UE is received, an antenna port used by the UE for transmission of the ACK/NACK signal, and constellation of the ACK/NACK signal, according to the predefined mapping relationship. Table 13 to Table 15 show examples of mapping between an ACK/NACK state, a channel, and an antenna port, transmitted by the 2Tx transmit diversity scheme according to the embodiment of the present invention described with reference to FIG. 15. Table 13, Table 14, and Table 15 correspond to M=2, M=3, M=4, respectively. Specifically, Table 13 shows a mapping table for 2-bit ACK/NACK information when Ch2 is additionally allocated for antenna port #1, Table 14 shows a mapping table for 3-bit ACK/NACK information when Ch3 is additionally allocated for antenna port #1, and Table 15 shows a mapping table for 4-bit ACK/NACK information when Ch4 is additionally allocated for antenna port #1.

TABLE 13

| | Antenna port #0 | | Antenna port #1 |
|---|---|---|---|
| State | Ch0 | Ch1 | Ch2 |
| NN | +1 | | +1 |
| NA | | +1 | +1 |
| AN | −1 | | −1 |
| AA | | −1 | −1 |

TABLE 14

| | Antenna port #0 | | | Antenna port #1 |
|---|---|---|---|---|
| State | Ch0 | Ch1 | Ch2 | Ch3 |
| NNN | 1 | | | 1 |
| NNA | −j | | | −j |
| NAN | j | | | j |
| NAA | | | 1 | 1 |
| ANN | | 1 | | 1 |
| ANA | | −j | | −j |
| AAN | | j | | j |
| AAA | | | −1 | −1 |

TABLE 15

| | Antenna port #0 | | | | Antenna port #1 |
|---|---|---|---|---|---|
| State | Ch0 | Ch1 | Ch2 | Ch3 | Ch4 |
| NNNN | 1 | | | | 1 |
| NNNA | −j | | | | −j |
| NNAN | j | | | | j |
| NNAA | −1 | | | | −1 |
| NANN | | 1 | | | 1 |
| NANA | | −j | | | −j |
| NAAN | | j | | | j |
| NAAA | | −1 | | | −1 |
| ANNN | | | 1 | | 1 |
| ANNA | | | −j | | −j |
| ANAN | | | j | | j |
| ANAA | | | −1 | | −1 |
| AANN | | | | 1 | 1 |
| AANA | | | | −j | −j |
| AAAN | | | | j | j |
| AAAA | | | | −1 | −1 |

Figure 16:
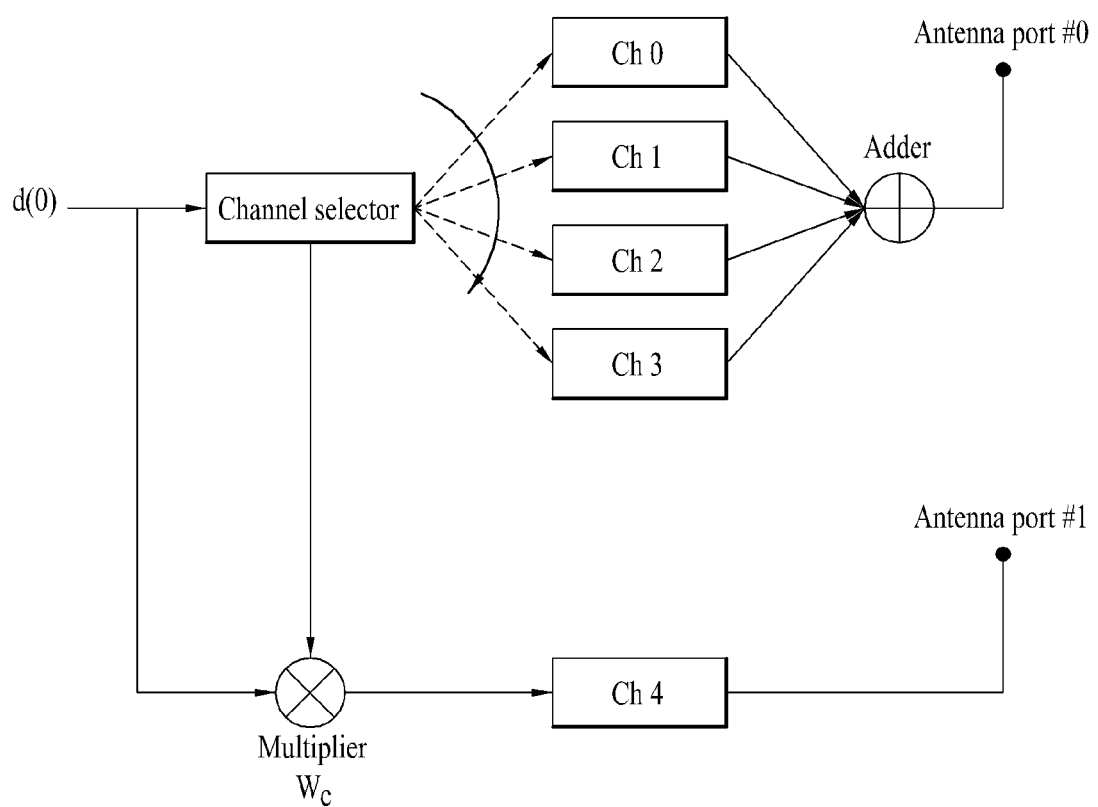
FIG. 16 illustrates a transmit diversity scheme according to another embodiment of the present invention.

FIG. 16 illustrates a transmit diversity scheme according to another embodiment of the present invention.

Referring to FIG. 16, a modulation symbol d(0) determined according to ACK/NACK information is transmitted through antenna port #0 on a channel selected based on the ACK/NACK information among Ch0, Ch1, Ch2, and Ch3 and $w_C*d(0)$, which is a modification of d(0), is transmitted through antenna port #1 on an additionally allocated resource Ch4. Here, $w_C$ is a certain complex value and may be information corresponding to a channel selected on antenna port #0. For example, $w_C$ may be defined as $e^{j2\pi(C/M)}$ and a complex signal $d(0)*e^{j2\pi(C/M)}$ may be transmitted through antenna port #1. Here, M is the number of orthogonal resources used for 1Tx channel selection transmission and C is a channel number selected according to the ACK/NACK information among channel numbers 0 to M−1. For example, when M=4, $w_C$ may be expressed as follows.

TABLE 16

| C | 0 | 1 | 2 | 3 |
|---|---|---|---|---|
| $w_C$ | $e^{j2\pi(C/M)} = 0$ | $e^{j2\pi(C/M)} = \pi/2$ | $e^{j2\pi(C/M)} = -1$ | $e^{j2\pi(C/M)} = 3\pi/4$ |

According to the embodiment of FIG. 15, a signal transmitted by antenna port #0 carries all of ACK/NACK information, whereas a signal transmitted by antenna port #1 carries only information corresponding to a modulation symbol out of the ACK/NACK information. That is, the signal transmitted by antenna port #1 expresses only a portion of the ACK/NACK information. In contrast, according to the embodiment of FIG. 16, not only the signal transmitted by antenna port #0 but also the signal transmitted by antenna port #1 carries all of the ACK/NACK information.

The mapping relationship between ACK/NACK information indicating an ACK/NACK state, a modulation symbol, a channel, and an antenna port may be predefined between the BS and the UE. The UE may determine a modulation symbol, a channel carrying the modulation symbol, an antenna port for transmitting the modulation symbol on the channel, and a phase difference (i.e. $w_C$) of signals to be transmitted through antenna ports, according to the predefined mapping relationship. The BS may determine/judge a channel on which an ACK/NACK signal transmitted by the UE is received, an antenna port used by the UE for transmission of the ACK/NACK signal, a constellation of the ACK/NACK signal, and/or a phase difference of signals transmitted through antenna ports of the UE, according to the predefined mapping relationship. Table 17 to Table 19 show examples of mapping between an ACK/NACK state, a channel, and an antenna port, transmitted by the 2Tx transmit diversity scheme according to the embodiment of the present invention described with reference to FIG. 16. Table 17, Table 18, and Table 19 correspond to M=2, M=3, M=4, respectively. Specifically, Table 17 shows a mapping table for 2-bit ACK/NACK information when Ch2 is additionally allocated for antenna port #1, Table 18 shows a mapping table for 3-bit ACK/NACK information when Ch3 is additionally allocated for antenna port #1, and Table 19 shows a mapping table for 4-bit ACK/NACK information when Ch4 is additionally allocated for antenna port #1.

TABLE 17

| State | Antenna port #0 | | Antenna port #1 |
|---|---|---|---|
| | Ch0 | Ch1 | Ch2 |
| NN | +1 | | +1 |
| NA | | +1 | −1 |
| AN | −1 | | −1 |
| AA | | −1 | +1 |

TABLE 18

| State | Antenna port #0 | | | Antenna port #1 |
|---|---|---|---|---|
| | Ch0 | Ch1 | Ch2 | Ch3 |
| NNN | 1 | | | 1 |
| NNA | −j | | | −j |
| NAN | j | | | j |
| NAA | | | 1 | $1*e^{j4\pi/3}$ |
| ANN | | 1 | | $1*e^{j\pi/3}$ |
| ANA | | −j | | $-j*e^{j\pi/3}$ |
| AAN | | j | | $j*e^{j\pi/3}$ |
| AAA | | | −1 | $-1*e^{j4\pi/3}$ |

TABLE 19

| State | Antenna port #0 | | | | Antenna port #1 |
|---|---|---|---|---|---|
| | Ch0 | Ch1 | Ch2 | Ch3 | Ch4 |
| NNNN | 1 | | | | 1 |
| NNNA | −j | | | | −j |
| NNAN | j | | | | j |
| NNAA | −1 | | | | −1 |
| NANN | | 1 | | | 1*(+j) |
| NANA | | −j | | | −j*(+j) |
| NAAN | | j | | | j*(+j) |
| NAAA | | −1 | | | −1*(+j) |
| ANNN | | | 1 | | 1*(−1) |
| ANNA | | | −j | | −j*(−1) |
| ANAN | | | j | | j*(−1) |
| ANAA | | | −1 | | −1*(−1) |
| AANN | | | | 1 | 1*(−j) |
| AANA | | | | −j | −j*(−j) |
| AAAN | | | | j | j*(−j) |
| AAAA | | | | −1 | −1*(−j) |

According to the above-described embodiments of the present invention, transmit diversity gain is achieved by a domain having poor performance of a selection domain and a constellation domain and additionally used resources are minimized, thereby suppressing increase of a DTX threshold value. If the additionally used resources are reduced, an effect of reducing UE multiplexing capacity is obtained. For example, it is assumed that 1Tx channel selection uses four orthogonal resources (i.e. M=4) and the number of orthogonal resources for 2Tx transmission is determined by M+n*(N$_{TX}$−1). If n=1, the number of orthogonal resources for transmit diversity according to the present invention is 5. In this case, the multiplexing capacity is 3.6/PRB when $\Delta^{PUCCH}_{shift}$=2. In consideration of the fact that the multiplexing capacity of 2Tx SORTD is 2.25/PRB when $\Delta^{PUCCH}_{shift}$=2, it can be understood that the multiplexing capacity of the transmit diversity scheme according to the present invention is greater than the multiplexing capacity of 2Tx SORTD. Table 20 shows a comparison between multiplexing capacity loss of 1Tx channel selection using four resources, 2Tx SORTD, and a 2Tx transmit diversity scheme of the present invention. In Table 20, in addition to four resources for channel selection, the number of additionally used resources for the 2Tx transmit diversity scheme according to an embodiment of the present invention is assumed to be one.

TABLE 20

| | 1Tx | 2Tx SORTD | 2Tx transmit diversity of the present invention |
|---|---|---|---|
| Number of used orthogonal resources | 4 | 8 | 5 |
| Multiplexing capacity per PRB | 4.5 UEs/PRB | 2.25 UEs/PRB | 3.6 UEs/PRB |
| Loss of multiplexing capacity to 1Tx | 0% | 50% | 20% |

Table 21 shows a comparison between multiplexing capacity loss of 1Tx channel selection, 4Tx SORTD, and a 4Tx transmit diversity scheme according to an embodiment of the present invention, when M=4. In Table 21, in addition to eight resources for channel selection, the number of additionally used resources for the 4Tx transmit diversity scheme according to an embodiment of the present invention is assumed to be one.

TABLE 21

| | 1Tx | 4Tx SORTD | 4Tx transmit diversity of the present invention |
|---|---|---|---|
| Number of used orthogonal resources | 8 | 32 | 12 |
| Multiplexing capacity per PRB | 2.25 UEs/PRB | 0.5625 UEs/PRB | 1.5 UEs/PRB |
| Loss of multiplexing capacity to 1Tx | 0% | 75% | 33.3% |

Referring to Table 20 and Table 21, in terms of capacity loss compared with conventional 2Tx SORTD, the transmit diversity scheme of the present invention generates greater gain as increases M increases and N$_{TX}$ increases.

The embodiments of the present invention are briefly described again with reference to FIGS. 1 and 2. In the embodiments of the present invention, the UE operates as the transmitting device 10 in UL and operates as the receiving device 20 in DL. In the embodiments of the present invention, the BS operates as the receiving device 20 in UL and operates as the transmitting device 10 in DL. The RF unit 13 of the transmitting device 10 implementing the transmit diversity scheme of the present invention receives, from the receiving device 20, information indicating a plurality of orthogonal resources for an antenna port to which channel selection is applied and receives, from the receiving device 20, information indicating a predefined number (e.g. one) of prescribed resources for antenna port(s) other than the antenna port to which channel selection is applied. In addition, the processor 13 of the transmitting device 10 may control the RF unit 13 to detect transmission information to be transmitted to the receiving device 20, for example, ACK/NACK information, to transmit a modulation symbol corresponding to the transmission information through the antenna port to which channel selection is applied on a resource selected based on the transmission information among the plurality of resources, and to transmit the modulation symbol through another antenna port on the prescribed resource.

Referring to FIG. 15 or 16, the RF unit 13 receives a plurality of resources for antenna port #0, i.e. information indicating a channel, and receives information indicating a specific resource for antenna port #1. The processor 11 may generate the ACK/NACK information based on signal(s) received from the receiving device 20. The processor 11 may generate a modulation symbol based on the ACK/NACK information to be transmitted to the receiving device 20 and select one of the plurality of resources. The processor 11 may control the RF unit 13 to transmit the modulation symbol to the receiving device 20 through antenna port #0 on the selected resource and to transmit the modulation symbol to the receiving device 20 through antenna port #1 on the specific resource. In FIG. 16, the processor 11 may control the RF unit 13 to multiply the modulation symbol by $w_C$ corresponding to a resource carrying the modulation symbol among the plurality of resources and to transmit a signal corresponding to the multiplied result through antenna port #1 on the specific resource.

The processor 21 of the receiving device 20 may control the RF unit 23 to detect or receive the modulation symbol on the plurality of resources and control the RF unit 23 to detect or receive the modulation symbol on the specific resource. The processor 21 may determine or restore the ACK/NACK information using a resource on which the modulation symbol is detected or received among the plurality of resources and using the modulation symbol. The processor 21 may determine whether the transmitting device 10 has successfully received signal(s), transmitted by the RF unit 23 of the receiving device 20 to the transmitting device 10, based on the ACK/NACK information. In FIG. 16, the RF unit 23 may receive, on the specific resource, a signal corresponding to multiplication of the modulation symbol and $w_c$ corresponding to a resource carrying the modulation symbol among the plurality of resources. In this case, the processor 21 may be aware of the modulation symbol based on the signal received on the specific resource and of the selected resource among the plurality of resources available for antenna port #0 of the transmitting device 10. Therefore, according to the embodiment of FIG. 16, the processor 21 may determine ACK/NACK information using only a signal transmitted through antenna port #0 of the transmitting device 10 and may also determine ACK/NACK information using only a signal transmitted through antenna port #1 of the transmitting device 10. The processor 21 may combine signals transmitted by antenna port #0 and antenna port #1 of the transmitting device 10 and, as a result, may detect ACK/NACK information with higher accuracy.

While the above-described embodiments of the present invention have been described by way of example of transmission of ACK/NACK information, the embodiments of the present invention may be applied in the same manner to transmission of control information other than the ACK/NACK information.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention is applicable to a UE, BS, or other devices of a wireless mobile communication system.

The invention claimed is:

1. A method for transmitting ACKnowledgement/Negative ACK (ACK/NACK) information to a base station by a user equipment including a plurality of antenna ports, comprising:
   receiving, from the base station, information indicating a plurality of first resources for a first antenna port and information indicating a second resource for a second antenna port among the plurality of antenna ports;
   determining a first resource from the plurality of first resources, and a modulation symbol according to an ACK/NACK information for the plurality of first resources;
   transmitting the determined modulation symbol to the base station through the first antenna port on the determined first resource; and
   transmitting a signal corresponding to multiplication of information $w_C$ and the determined modulation symbol on the second resource to the base station through the second antenna port,
   wherein the information $w_C$ is $e^{j2\pi(C/M)}$ where M is the number of the plurality of first resources and C is an index number of the determined first resource among the plurality of first resources.

2. A method for receiving, by a base station, ACKnowledgement/Negative ACK (ACK/NACK) information from a user equipment including a plurality of antenna ports, comprising:
   transmitting, to the user equipment, information indicating a plurality of first resources for a first antenna port of the user equipment and information indicating a second resource for a second antenna port of the user equipment;
   receiving a modulation symbol on one first resource among the plurality of first resources from the user equipment;
   receiving a signal corresponding to multiplication of information $w_C$ and the modulation symbol on the second resource from the user equipment; and
   determining the ACK/NACK information for the plurality of first resources using the modulation symbol and the first resource on which the modulation symbol is received and using the signal on the second resource,
   wherein the information $w_C$ is $e^{j2\pi(C/M)}$ where M is the number of the plurality of first resources and C is an index number of the received one first resource among the plurality of first resources.

3. A user equipment including a plurality of antenna ports, for transmitting ACKnowledgement/Negative ACK (ACK/NACK) information to a base station, comprising:
   a radio frequency (RF) unit configured to transmit/receive a radio signal; and
   a processor configured to control the RF unit,
   wherein the processor controls the RF unit to receive, from the base station, information indicating a plurality of first resources for a first antenna port and information indicating a second resource for a second antenna port among the plurality of antenna ports, determines a first resource from the plurality of first resources and a modulation symbol according to an ACK/NACK information for the plurality of first resources, controls the RF unit to transmit the determined modulation symbol to the base station through the first antenna port on the determined first resource, and controls the RF unit to transmit a signal corresponding to multiplication of information $w_C$ and the determined modulation symbol on the second resource to the base station through the second antenna port, wherein the information $w_C$ is $e^{j2\pi(C/M)}$ where M is the number of the plurality of first resources and C is an index number of the determined first resource among the plurality of first resources.

4. A base station for receiving ACKnowledgement/Negative ACK (ACK/NACK) information from a user equipment including a plurality of antenna ports, comprising:
a Radio Frequency (RF) unit configured to transmit/receive a radio signal; and
a processor configured to control the RF unit,
wherein the processor controls the RF unit to transmit, to the user equipment, information indicating a plurality of first resources for a first antenna port of the user equipment and information indicating a second resource for a second antenna port of the user equipment, controls the RF unit to receive a modulation symbol on one first resource among the plurality of first resources from the user equipment and to receive a signal corresponding to a multiplication of information $w_C$ and the modulation symbol on the second resource from the user equipment, and determines the ACK/NACK information for the plurality of first resources using the modulation symbol and the first resource on which the modulation symbol is received and using the signal on the second resource,
wherein the information $w_C$ is $e^{j2\pi(C/M)}$ where M is the number of the plurality of first resources and C is an index number of the received one first resource among the plurality of first resources.

\* \* \* \* \*